US011269236B2

United States Patent
Timurdogan et al.

(10) Patent No.: US 11,269,236 B2
(45) Date of Patent: Mar. 8, 2022

(54) TUNABLE OPTICAL STRUCTURES

(71) Applicant: Analog Photonics LLC, Boston, MA (US)

(72) Inventors: Erman Timurdogan, Somerville, MA (US); Ehsan Shah Hosseini, Boston, MA (US); Michael Robert Watts, Hingham, MA (US); Michael J. Whitson, Salem, MA (US)

(73) Assignee: Analog Photonics LLC, Boston, MA (US)

(*) Notice: Subject to any disclaimer, the term of this patent is extended or adjusted under 35 U.S.C. 154(b) by 57 days.

(21) Appl. No.: 16/887,162

(22) Filed: May 29, 2020

(65) Prior Publication Data
US 2020/0292913 A1 Sep. 17, 2020

Related U.S. Application Data

(62) Division of application No. 16/132,412, filed on Sep. 15, 2018, now Pat. No. 10,690,993.

(60) Provisional application No. 62/558,920, filed on Sep. 15, 2017.

(51) Int. Cl.
G02F 1/335 (2006.01)
G02F 1/295 (2006.01)
(52) U.S. Cl.
CPC ............ G02F 1/335 (2013.01); G02F 1/2955 (2013.01)
(58) Field of Classification Search
None
See application file for complete search history.

(56) References Cited

U.S. PATENT DOCUMENTS

| | | | |
|---|---|---|---|
| 10,234,745 B2* | 3/2019 | Moffitt | G02B 6/12004 |
| 10,690,993 B2* | 6/2020 | Timurdogan | G02F 1/2955 |
| 2018/0217473 A1 | 8/2018 | Frank et al. | |
| 2018/0246390 A1* | 8/2018 | Park | G02F 1/2955 |
| 2020/0292913 A1* | 9/2020 | Timurdogan | G02F 1/335 |
| 2021/0263389 A1* | 8/2021 | Hosseini | G02F 1/292 |

FOREIGN PATENT DOCUMENTS

| | | | |
|---|---|---|---|
| CN | 102566193 A | * | 7/2012 |
| WO | 2019/135787 A2 | | 7/2019 |

OTHER PUBLICATIONS

I. Abdulhalim, "Optimized guided mode resonant structure as thermooptic sensor and liquid crystal tunable filter", Chinese Optics Letters, vol. 7, No. 8, pp. 667-670, Aug. 10, 2009.
Y. Huang et al., "Gate-Tunable Conducting Oxide Metasurfaces", https://www.researchgate.net/publication/307091091 (Aug. 2016).
K Lee et al., "Multiple p-n junction subwavelength gratings for transmission-mode electro-optic modulators", Scientific Reports 7, 46508; doi: 10 1038/srep46508 (2017).
J. Park et al., "Electrically Tunable Epsilon-Near-Zero (ENZ) Metafilm Absorbers", https://www.researchgate.net/publication/284104220 (2015).

* cited by examiner

Primary Examiner — Michelle R Connelly
(74) Attorney, Agent, or Firm — Young Basile Hanlon & MacFarlane, P.C.

(57) ABSTRACT

Aspects of the present disclosure describe optical structures and devices, and more particularly to improved, tunable optical structures including optical gratings that are dynamically affected and/or tuned by acousto-optic or electro-optic mechanisms.

25 Claims, 26 Drawing Sheets

TUNABLE OPTICAL STRUCTURES

CROSS REFERENCE TO RELATED APPLICATIONS

This application is a divisional of U.S. patent application Ser. No. 16/132,412 filed Sep. 15, 2018, which claims the benefit of U.S. Provisional Patent Application Ser. No. 62/558,920 filed Sep. 15, 2017 the entire contents of which are incorporated by reference as if set forth at length herein.

TECHNICAL FIELD

This disclosure relates generally to optical structures and devices, and more particularly to improved, tunable optical structures including optical gratings that are dynamically affected and/or tuned by acousto-optic or electro-optic mechanisms.

BACKGROUND

As is known, systems, methods, and structures that employ photonic integrated circuits (PICs) and directed light emitted therefrom are expected to find widespread applicability in many contemporary applications including light detection and ranging (LiDAR), free space communications, and holographic displays. Accordingly, systems, methods, and structures that facilitate the emission or directional control of light emitted from PICs would represent a welcome addition to the art.

SUMMARY

An advance in the art is made according to aspects of the present disclosure directed to dynamically tunable optical structures including optical gratings that are induced in the structures by the application of acousto-optic and/or electro-optic mechanisms.

In sharp contrast to the prior art, optical structures according to the present disclosure advantageously provide an out-of-plane emission of light relative to the optical structure in addition to exhibiting dynamic tunability.

BRIEF DESCRIPTION OF THE DRAWING

A more complete understanding of the present disclosure may be realized by reference to the accompanying drawing in which.

Figure 1:
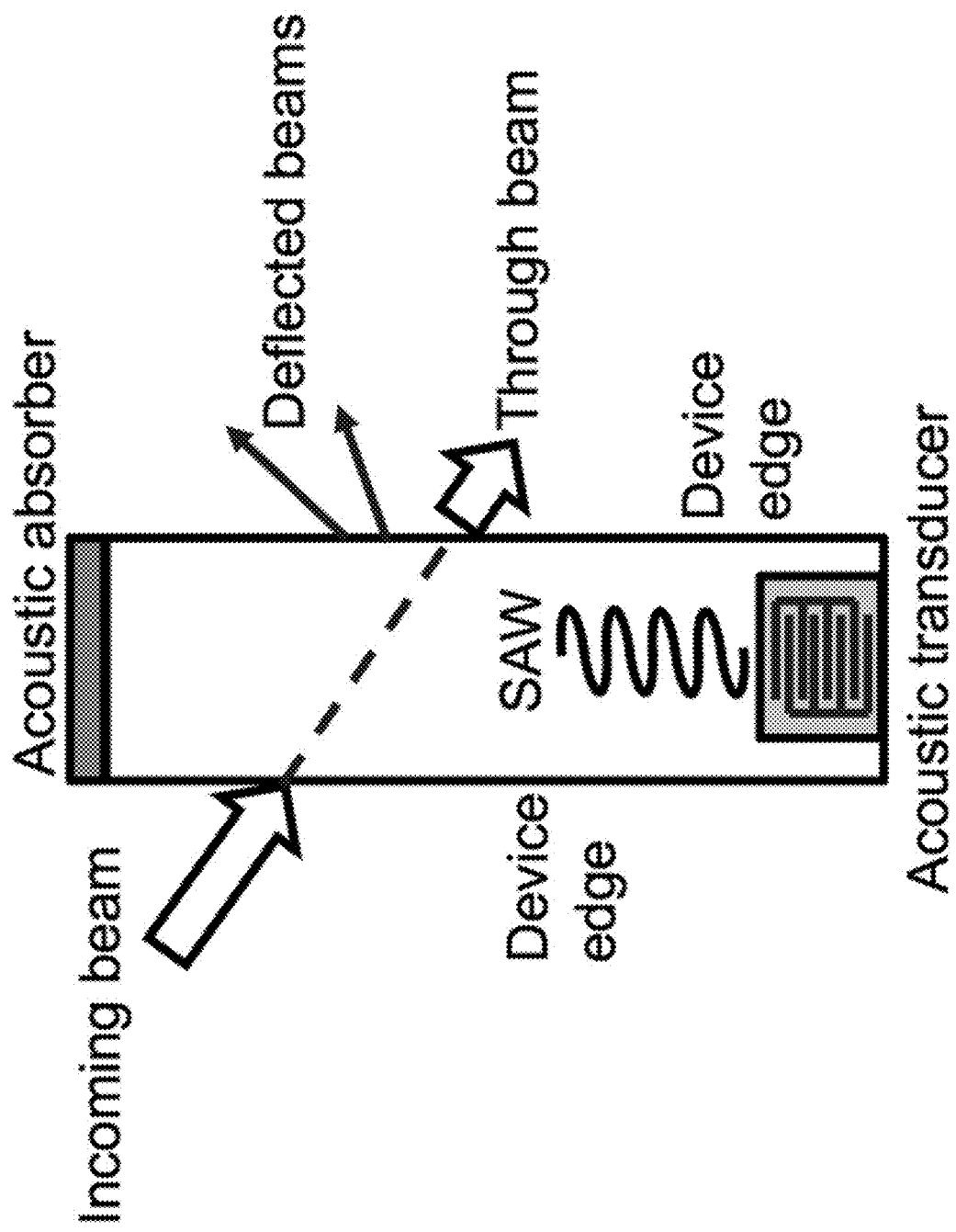
FIG. 1 is a schematic illustrating a prior-art edge coupled acousto-optic deflector.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

Acoustic Tuning

By way of some further background we turn our attention to FIG. 1 which shows a schematic illustrating a prior art, edge coupled acousto-optic deflector (AOD). As is known in the art, such an AOD employs an acousto-optic effect to deflect light using sound waves. As illustrated in FIG. 1, an acoustic transducer—positioned at one end of an optical material—generates acoustic waves which generally propagate along a surface of the material as a surface acoustic wave (SAW). Advantageously, the generation of acoustic waves may be accomplished via known piezoelectric materials.

While not specifically shown in the figure, a wave vector of the acoustic wave—which generally depends on a period of any interdigitated piezoelectric transducer and frequency of microwave excitation) is added to the propagation vector of an incoming light beam as it passes through the material such that one or more deflected beams may result. As a result, the energy of the light beam is depleted of energy and intensity(ies) of through beam(s) is/are reduced. If only one deflected beam is desired, the wavelength of the SAW must be small so short period transducers and high frequency RF excitation is generally required.

We note at this point that the device shown in FIG. 1 may deflect (steer) light in a single, in-plane dimension only. And while such structures and systems constructed therefrom may be suitable for certain free-space input and output configurations, their application to photonic integrated circuits are at least more challenging.

In sharp contrast to any deflection achieved by edge coupled acousto-optic deflectors such as those illustrated in FIG. 1, structures according to the present disclosure which we shall illustratively show and describe, advantageously emit light out of the plane of the optical material (i.e., optical waveguide). Operationally, such out-of-plane emission is affected by inducing a change in refractive index in and around an optical waveguide due to strain or stress caused by an acoustic wave.

Figure 2:
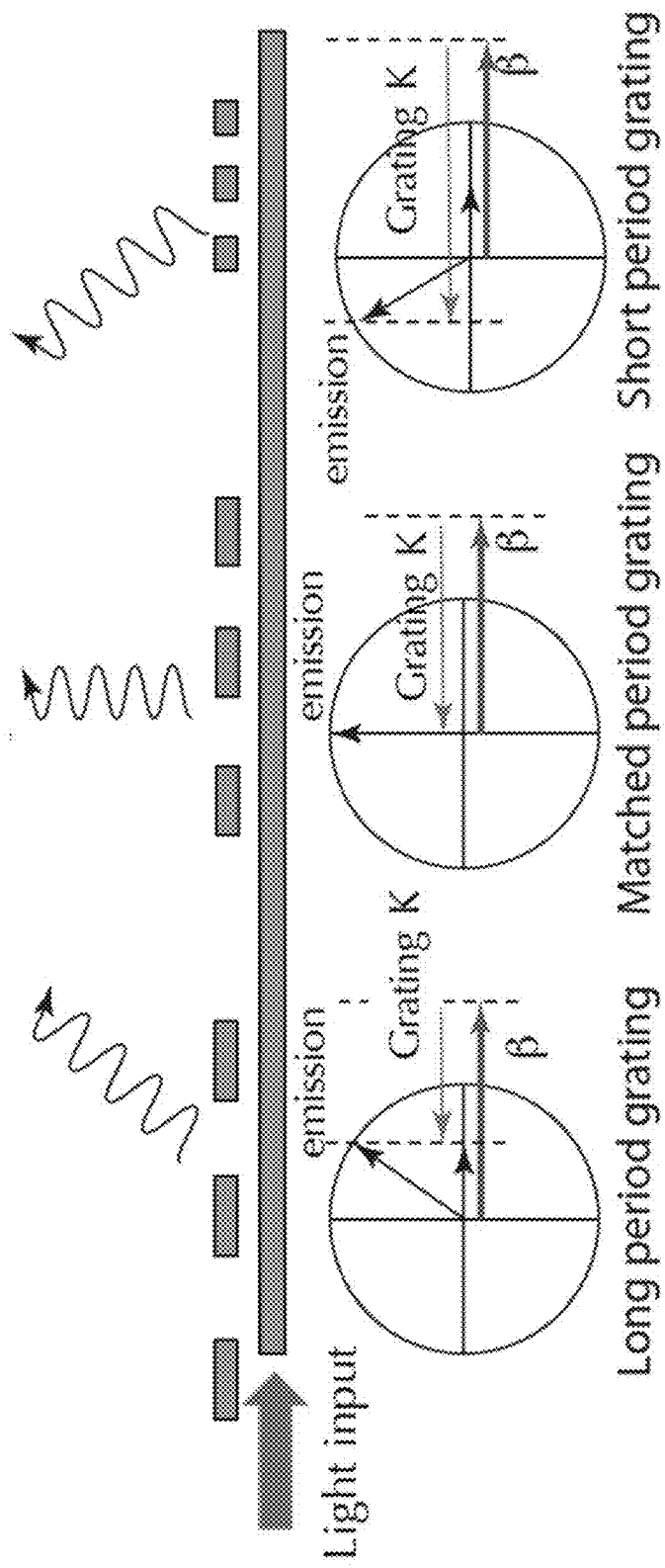
FIG. 2 is a schematic illustrating a perturbation grating inducing a guided optical mode to be emitted out of plane for a waveguide according to aspects of the present disclosure.

Turning now to FIG. 2, there is shown a schematic illustration of a perturbation grating and its effect on a guided light beam traversing—for example—a silicon waveguide. Depicted illustratively in that figure are three gratings namely, a long period grating, a matched period grating, and a short period grating. As may be observed from that figure, the guided light is emitted out of the waveguide because of the perturbations around the waveguide and the direction of the emission(s) is/are determined by the period of the perturbations. Generally, when a Bragg condition is met, light is emitted in a direction substantially perpendicular to its direction of travel. Shorter periods will cause a backward directed emission (reverse direction to the direction of light travel) while a longer period grating will cause a forward directed emission (in the direction of travel of the light). Note that in this illustrative FIG. 2—and as generally known in the art—the perturbations (gratings) are fixed, and therefore to change the direction of emission one must either physically the index of the waveguide or change the wavelength of the light.

Advantageously, systems, methods, and structures according to the present disclosure are not so infirmed.

Figure 3:
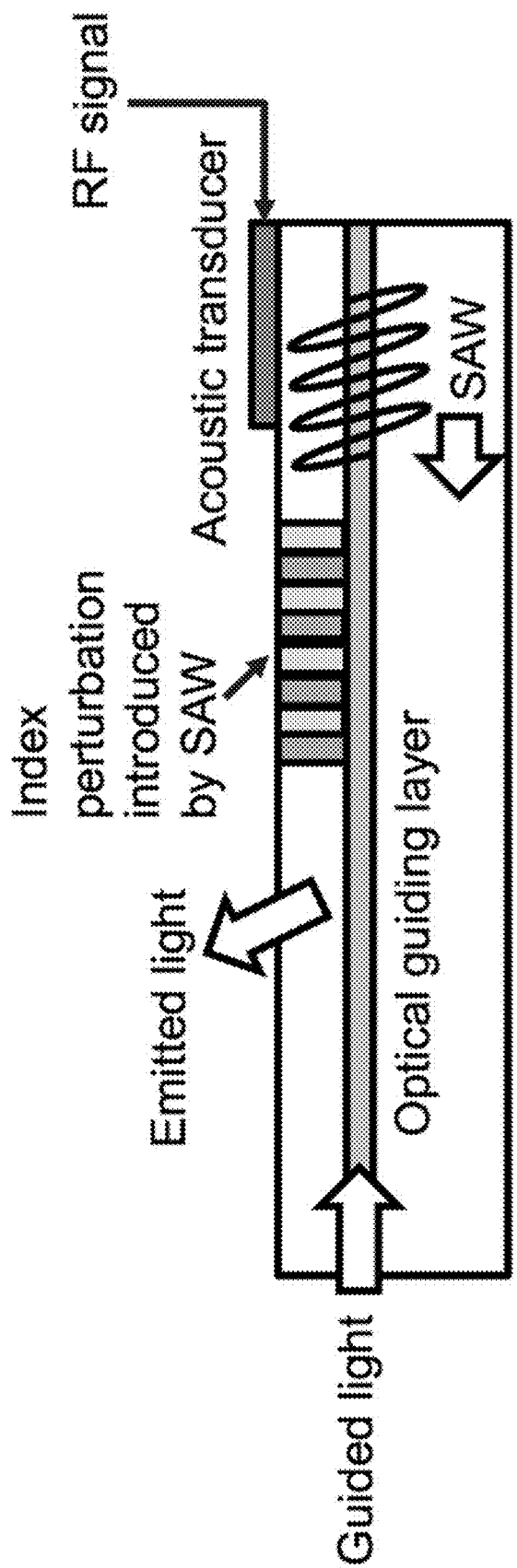
FIG. 3 is a schematic illustrating out of plane emission induced by a surface acoustic wave (SAW) according to aspects of the present disclosure.

FIG. 3 is a schematic, cross-sectional view illustrating out-of-plane emission induced by a surface acoustic wave according to aspects of the present disclosure. As may be observed from that figure, an optical waveguide structure includes an optical guiding layer throughout its length, the waveguide structure including an acoustic transducer.

Operationally, the transducer will generate a surface acoustic wave in the waveguide structure upon receipt of a suitable RF signal. The surface acoustic wave so generated is generally confined between a topmost surface of the waveguide structure and a bottom most surface of that same waveguide structure. Depending upon the thickness of the waveguide structure (device) and the frequency of the RF signal applied to the transducer, resonant acoustic mode(s) of a relatively thin layer (film) of that waveguide structure proximate to its surface will be excited and travel along its length. In FIG. 3, such direction is illustrated from right to left.

This traveling, surface acoustic wave will create mechanical strain in the optical guiding layer and its surrounding material and perturb the guided optical mode such that an induced index perturbation is produced. Such perturbations may be relatively weak—as compared with those statically created with lithography—as shown illustratively in FIG. 2—but nevertheless sufficient to redirect light out of a device that is only millimeters long. Advantageously—and according to aspects of the present disclosure, the light is emitted in a direction out of plane relative to the planar orientation of the device.

As those skilled in the art will readily appreciate, as the frequency of the RF signal is changed, the wavelength of the resonant acoustic mode changes and the period of induced perturbations changes as well. As previously discussed with respect to FIG. 2, since the direction of emission is dependent on the period of perturbations, changing the frequency of the RF signal effectively steers emitted light (for example—in backward and/or forward directions). Note that in FIG. 3, since guided light is traveling toward the acoustic wave in this illustrative example (right to left in the FIG. 3), the light is blue shifted because of the known Doppler effect. Accordingly, the energy of the incoming phonons is added to the energy of the light photons resulting in higher energy (blue shifted) photons.

Importantly, such a Doppler shift may be useful if emitted light is to be later mixed with the original light (acting as a local oscillator) to create a GHz-scale, beat note away from the baseband and the 1/f noise of detection devices. If, however, such Doppler shift is not desirable in a particular application, according to the present disclosure the acoustic wave employed may be a standing wave.

Figure 4:
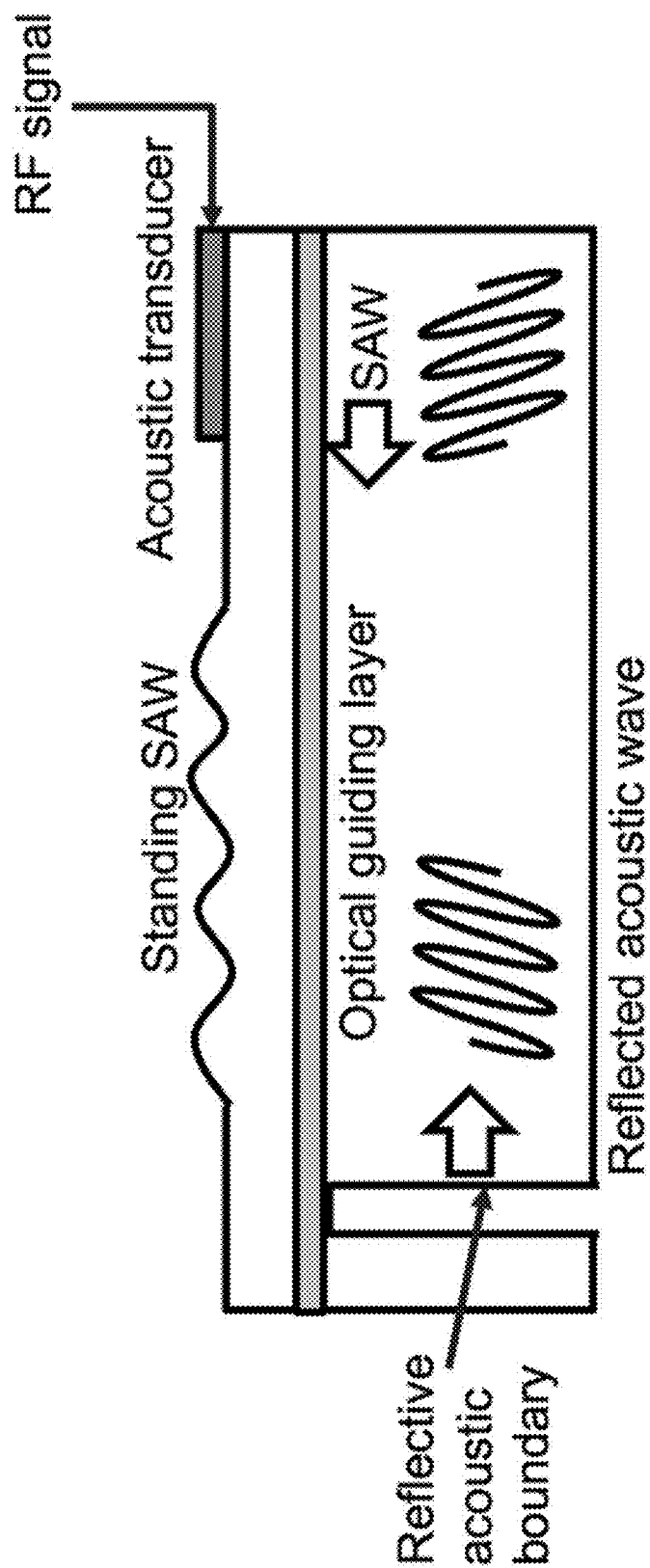
FIG. 4 is a schematic illustrating the generation of a standing acoustic wave by reflection from a boundary to while eliminating Doppler shifting of emitted light according to aspects of the present disclosure.

FIG. 4 is a schematic illustrating the generation of a standing acoustic wave by reflection from a hard boundary that advantageously may eliminate Doppler shift of emitted light according to aspects of the present disclosure. Shown illustratively in that figure, an acoustic transducer—upon receipt of an RF signal—generates a surface acoustic wave in an optical waveguide that travels along a length of that waveguide. In the direction of travel of that acoustic wave is positioned a reflective acoustic boundary. The traveling acoustic wave—upon striking the reflective acoustic boundary—will reflect therefrom in a direction back toward the acoustic transducer. The reflected acoustic wave(s) and the surface acoustic wave(s) meet in a region in-between the transducer and the reflective boundary and combine to produce a standing surface acoustic wave in that in-between region of the waveguide. As previously noted, such a standing surface acoustic wave induces perturbations in the waveguide that may effectively direct guided light out of that waveguide without exhibiting a Doppler shift.

Figure 5:
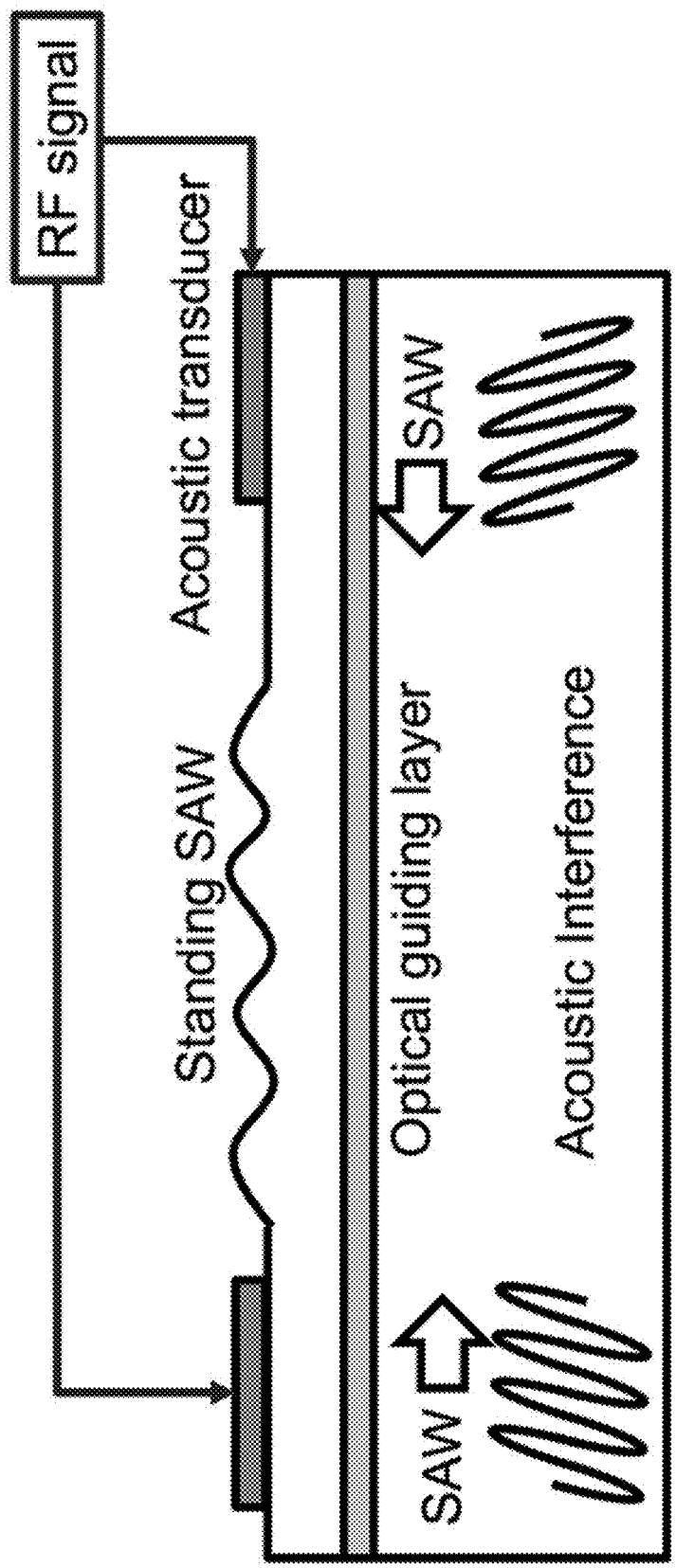
FIG. 5 is a schematic illustrating the generation of a standing acoustic wave from two opposed acoustic transducers to eliminate Doppler shifting of emitted light according to aspects of the present disclosure.

FIG. 5. is a schematic illustrating the generation of a standing acoustic wave generated by two acoustic transducers that may advantageously eliminate Doppler shift of emitted light according to aspects of the present disclosure. As illustratively shown in that figure, an optical waveguide structure includes a pair of acoustic transducers positioned a distance apart upon a topmost surface of that structure. An RF signal—applied simultaneously to both transducers, generates a surface acoustic wave from each transducer that travels toward one another in the structure. The traveling waves acoustically interfere at a region in-between the two transducers and interfere such that a standing surface acoustic wave is produced. The standing surface acoustic wave induces perturbations in the waveguide structure sufficient to affect the out-of-plane emission of light guided within the waveguide structure (not specifically shown in this figure). Note that while this FIG. 5 shows only two transducers employed and driven, those skilled in the art will appreciate that alternative numbers and/or arrangements of the transducers are possible and contemplated.

At this point, those skilled in the art will readily understand and appreciate that changing the applied RF frequency may be combined with a change in wavelength of guided light to produce a "rough" and "fine" adjustment of direction of emission.

Figure 6:
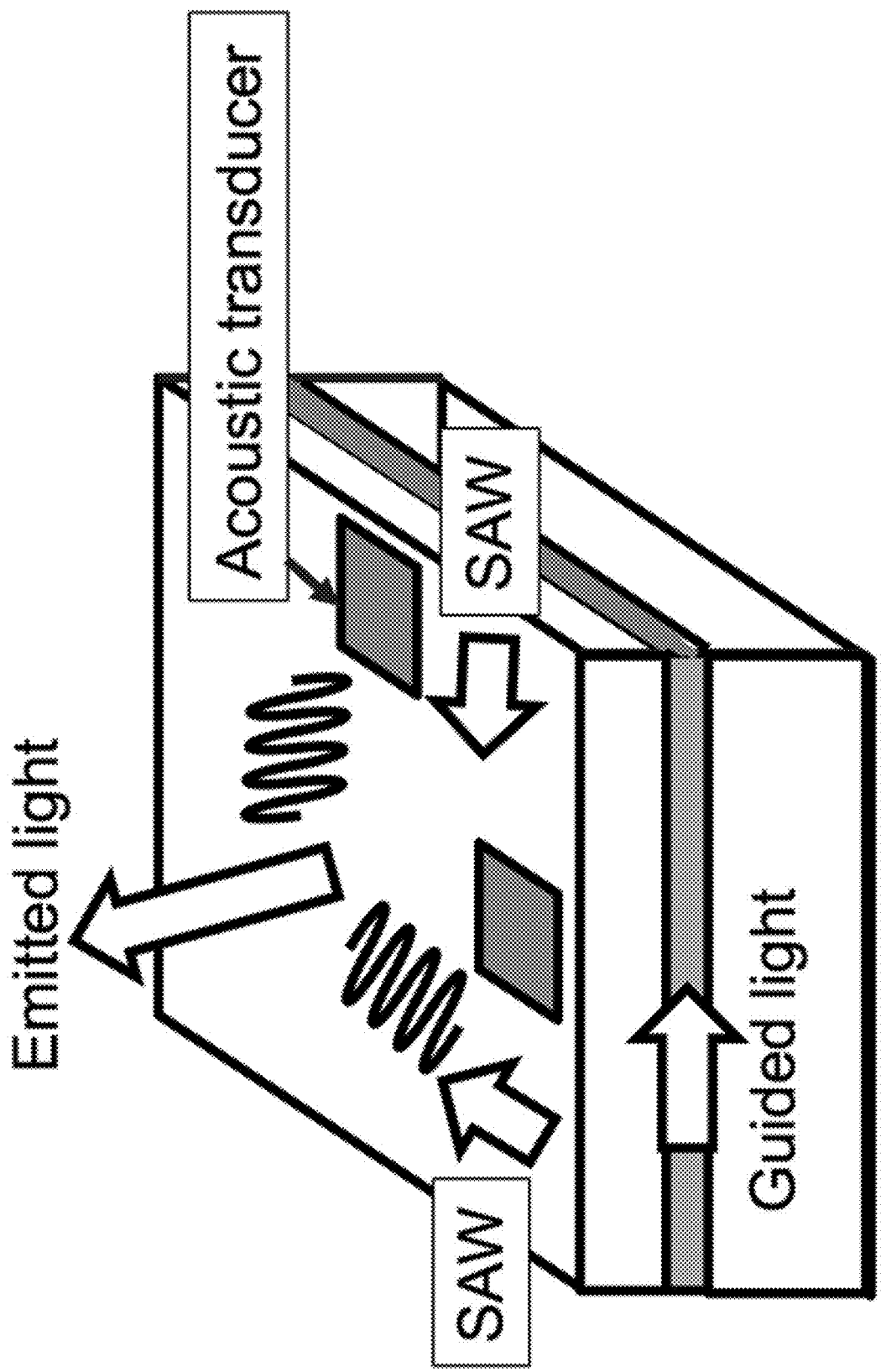
FIG. 6 is a schematic illustrating the generation of surface acoustic waves in both longitudinal and lateral directions through the effect of two acoustic transducers and the resulting directing of light out of plane in two dimensions according to aspects of the present disclosure.

Note that structures according to the present disclosure may advantageously steer light emitted in more than one dimension. With reference now to FIG. 6, there is shown an illustrative, top-perspective view of a schematic waveguide structure employing two acoustic transducers for creating surface acoustic waves in both the longitudinal and lateral directions and steer light out of plane of the structure in two dimensions. As illustratively shown in that figure, the acoustic transducers are positioned such that emitted surface acoustic waves emitted from each combine at an angle relative to one another and thereby generate perturbations in the waveguide structure such that emitted light is steerable over two dimensions by adjusting the RF driving signal (or the wavelength of the light).

Figure 7:
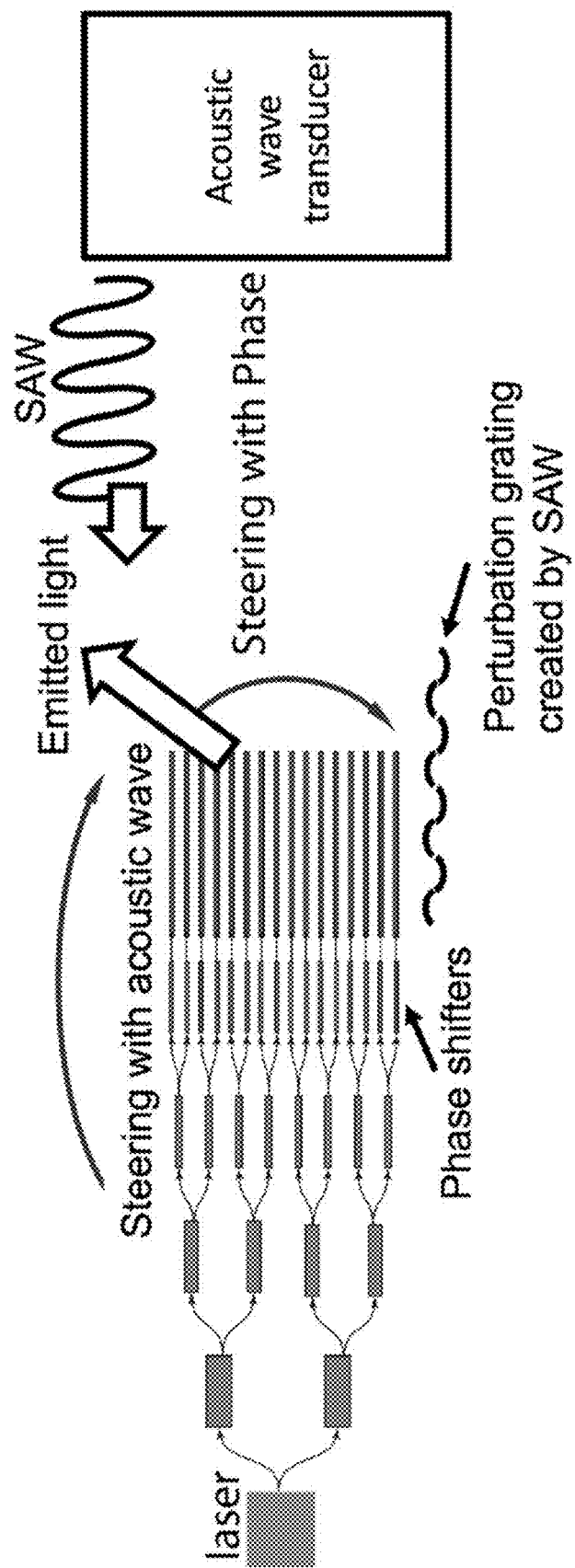
FIG. 7 is a schematic illustrating a tree structure including phase shifters that steers light in a lateral direction while a SAW steers the light in a longitudinal direction according to aspects of the present disclosure.

We now note that such sideways light steering may advantageously achieved—according to further aspects of the present disclosure—by creating a phased array. Turning now to FIG. 7, there is shown a schematic illustrating a set of phase shifters implemented in a tree structure and part of a phased array of emitters (antennae) that are configured to steer light in a lateral direction while a surface acoustic wave steers light in a longitudinal direction—according to aspects of the present disclosure.

As shown in FIG. 7, a phased array antenna structure including a set of emitters (antenna) are in optical communication with a light source—shown in the figure as a laser. Interposed between the emitters and the light source are a set of phase shifters that are illustratively arranged in a tree structure. Changes in phase introduced by activating individual one(s) of the phase shifters in a prescribed manner cause a change in direction of an emitted phase front of the emitted light. Note that as shown in this figure the individual phase shifters may advantageously be any of a known kind. By adjusting the phase shifters, the emitted light may be steered in a lateral direction. If—according to the present disclosure—a surface acoustic wave is employed to generate a perturbation in the waveguide emitters, an out of plane coupling is produced thereby permitting longitudinal steering of the emitted light.

Note that as depicted in FIG. 7, the phased array may be advantageously implemented as a photonic integrated circuit (PIC) on a single semiconductor chip—without the laser. When so implemented, the acoustic wave as illustrated in that figure will propagate in the entire chip and therefore will affect all the waveguides comprising the phased array simultaneously. When each waveguide has its own individual acoustic transducer however, it is possible to excite one or more individual waveguides by activating any individual transducer(s) associated with that/those individual waveguide(s).

Figure 8:
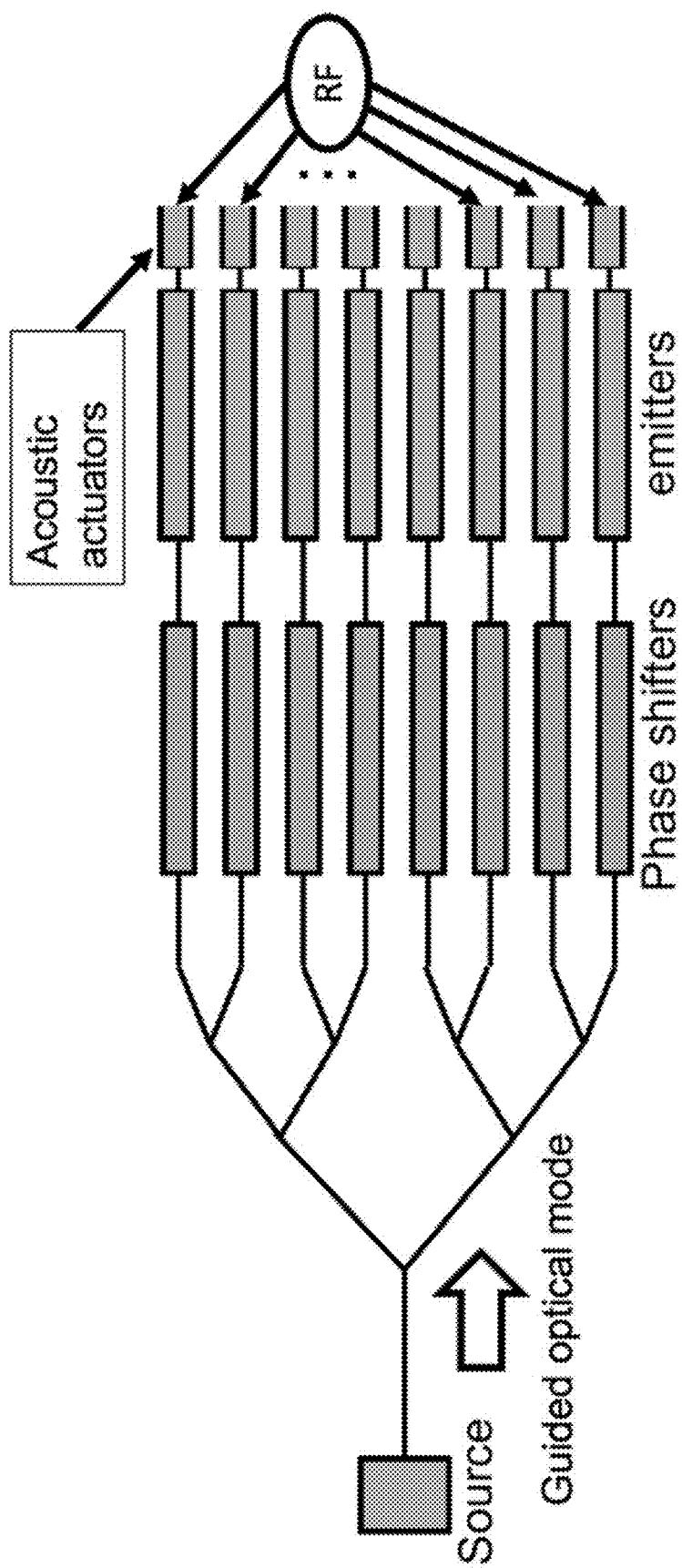
FIG. 8 is a schematic illustrating an optical phased array arrangement including individual acoustic transducer actuators according to aspects of the present disclosure.

FIG. 8 shows a schematic illustrating such a configuration in which individual waveguides of a phased array may be excited individually by individual acoustic transducers according to aspects of the present disclosure. As illustrated in that figure, a phased array including a plurality of phase shifters arranged in a tree structure and individually associated with an emitter, further includes a plurality of individual acoustic transducers individually coupled to one of the individual emitters. Shown further in the figure is that each of the acoustic transducers are individually activated by an individual, respective RF driver signal generated from a common RF source.

Operationally, the phased array receives light emitted from a laser source coupled to the array. Each one of the individual acoustic transducers specifically excites an acoustic wave into a respective optical waveguide emitter. Advantageously, the phase shifters may adjust the phase of the optical mode of the light entering an emitter and the acoustic wave(s) generated by the acoustic transducers may further affect the light emission direction. When the RF signal applied to the acoustic transducer(s) is varied the frequency and wavelength of the generated acoustic waves are varied and the direction of emission of the light is varied. Note that the phase shifters employed in the configuration illustrated in FIG. 8 may induce an undesirable amount of loss or consume an undesirable amount of power.

Figure 9:
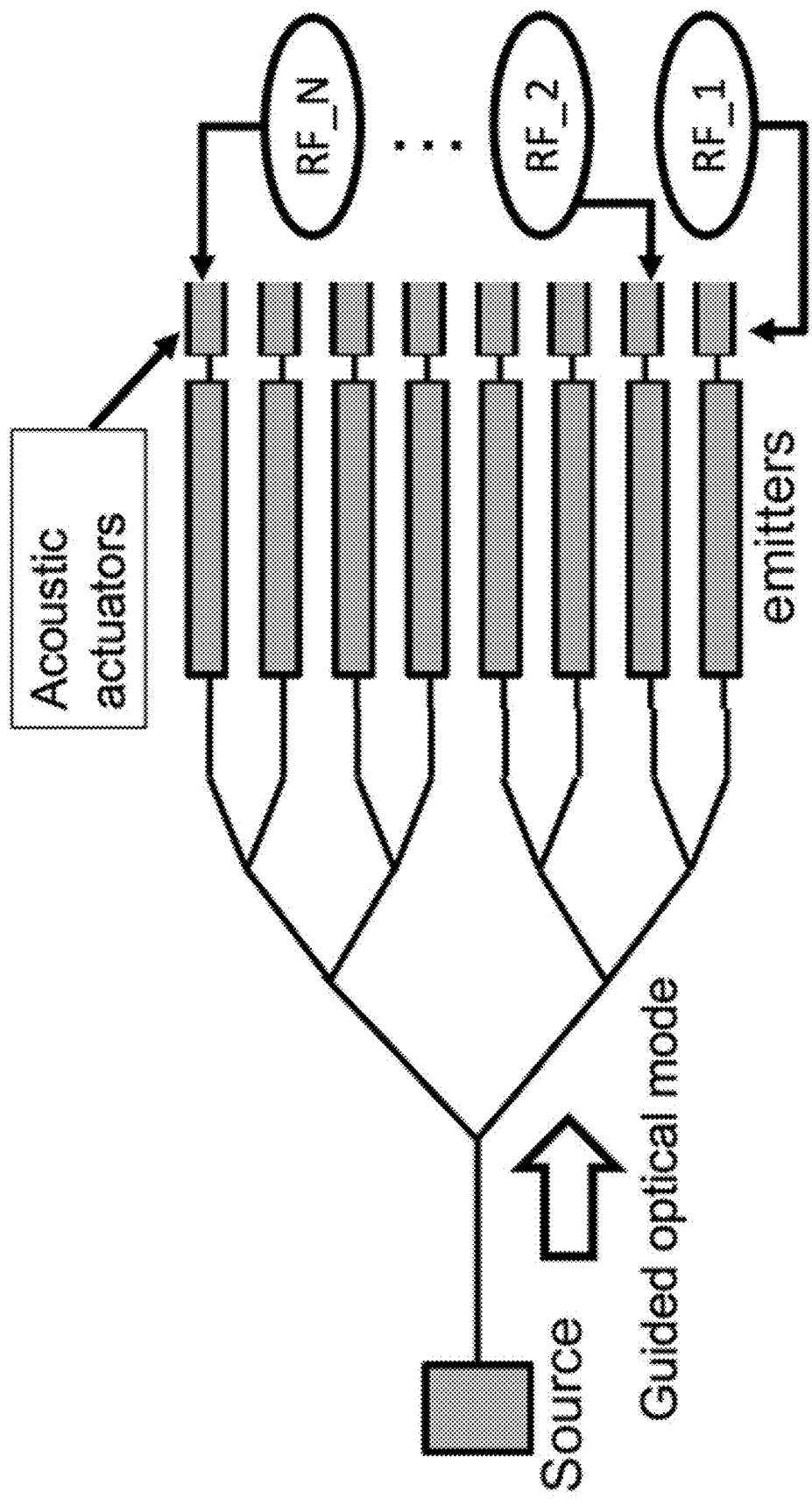
FIG. 9 is a schematic illustrating an optical phased array arrangement including individual acoustic transducers that advantageously eliminate phase shifters according to aspects of the present disclosure.

FIG. 9 illustrates an alternative configuration wherein individual acoustic transducers are individually controlled by an individual RF signal generated by a respective RF generator according to yet another aspect of the present disclosure. As may be observed from this figure, there are no phase shifters coupled to the emitters. When so configured, the phase(s) of the RF sources are used to control the phase of the emitted light from each individual one of the optical waveguides (emitters).

Figure 10:
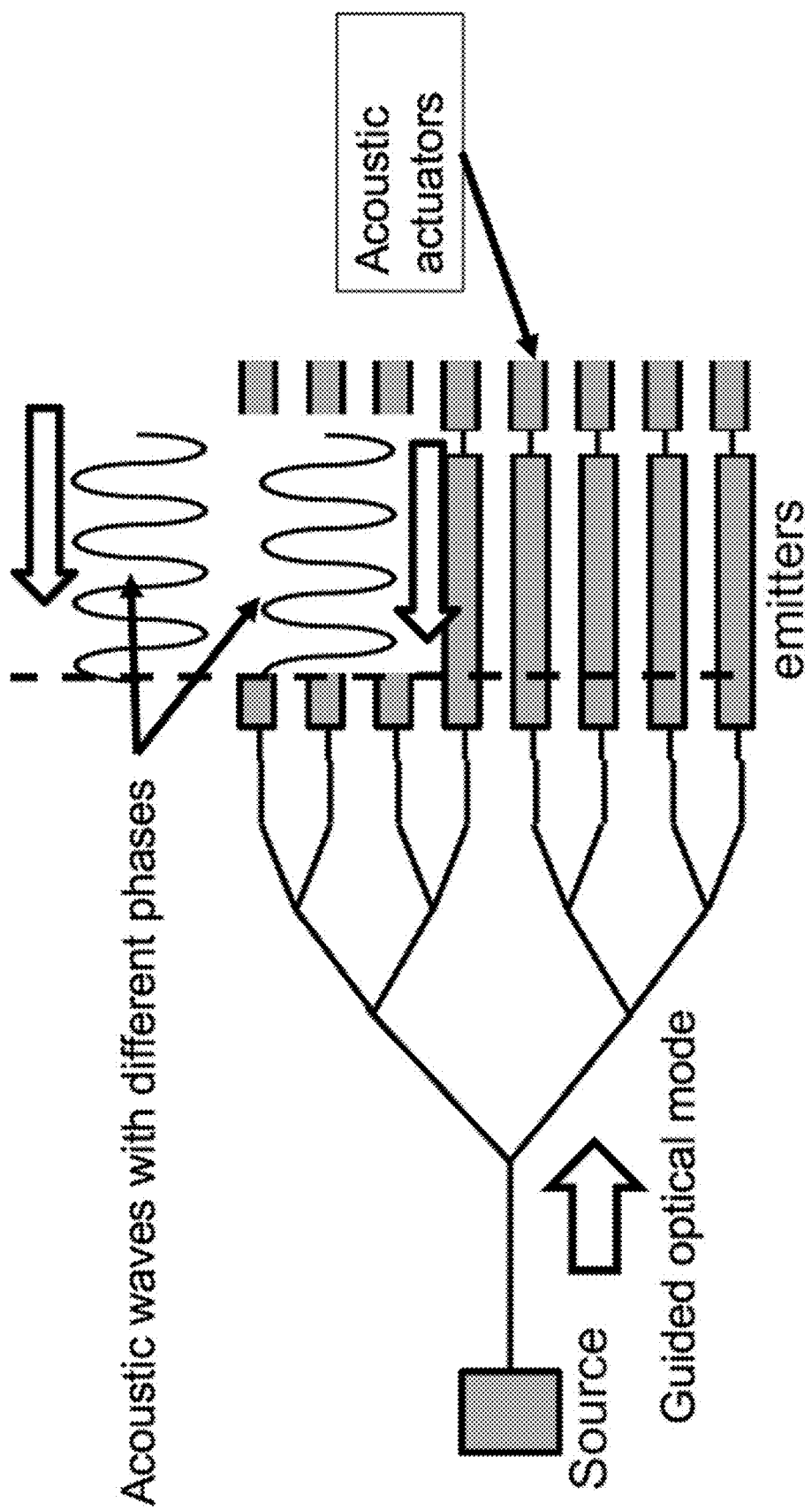
FIG. 10 is a schematic illustrating an optical phased array including acoustic transducers configured such that controlling the phase(s) of acoustic waves effect control of the phased array emission(s) according to aspects of the present disclosure.

Advantageously, and as will be readily appreciated by those skilled in the art, using the phase of the acoustic wave as the phase control mechanism in a phased array may eliminate the need for optical phase shifters. In this method, the sideways direction of emission of the entire array is controlled by the phase of the acoustic waves and the lateral direction of emission is controlled by the frequency of the RF sources. Such a configuration is shown schematically in FIG. 10, illustrating the control of the phases of the acoustic waves to control the phased array emission(s)—according to aspects of the present disclosure.

Note that the multiple RF sources (shown as one for each acoustic transducer) may be replaced by a common RF generator with adjustable delays in the signal paths to the acoustic transducers. As the frequency of all of the RF sources is normally equal (the direction of emission from all emitters is the same), the phased array configuration illustrated in FIG. 9 is simplified to a single, common source and RF delays that may be tuned by tunable RLC circuits or electrical buffer elements.

Figure 11:
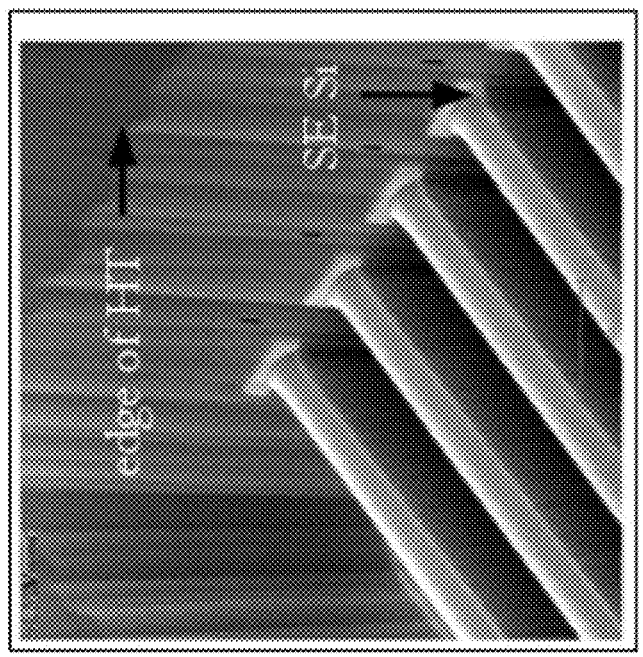
FIG. 11 is a schematic illustrating how acoustic mode may be induced and guided in a photonics waveguide according to aspects of the present disclosure.
Figure 11:
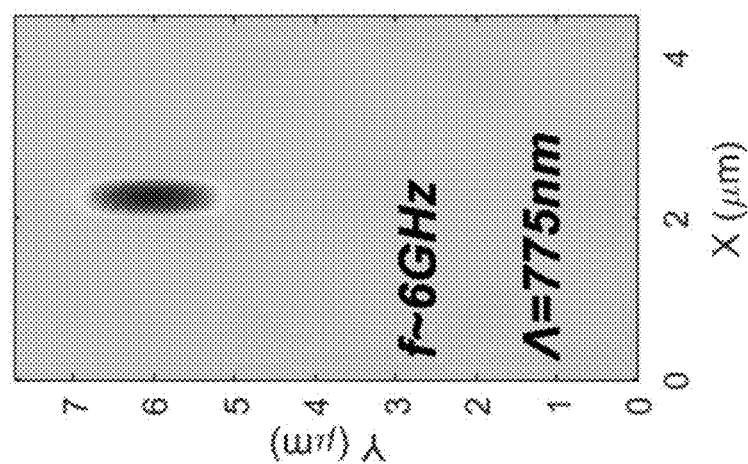
Figure 11:
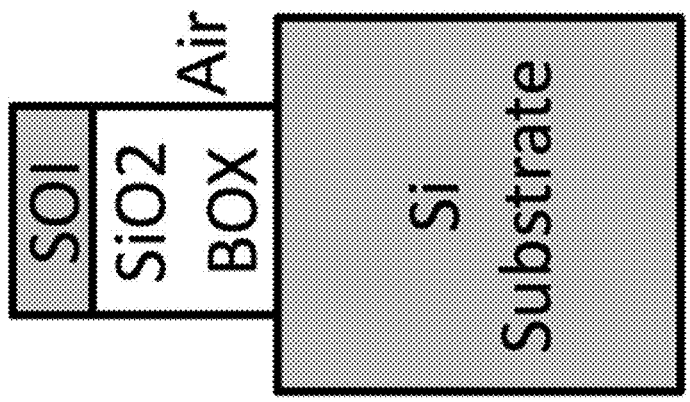

At this point we note FIG. 11, which illustrates schematically, and photomicrographically, structures associated with exciting an acoustic mode and guided in an optical (photonic) waveguide. More particularly, show illustratively therein is a schematic diagram of a silicon on insulator (SOI) structure employing a layered silicon-insulator-silicon substrate construction including silicon dioxide insulator and buried oxide layer (BOX).

Figure 12:
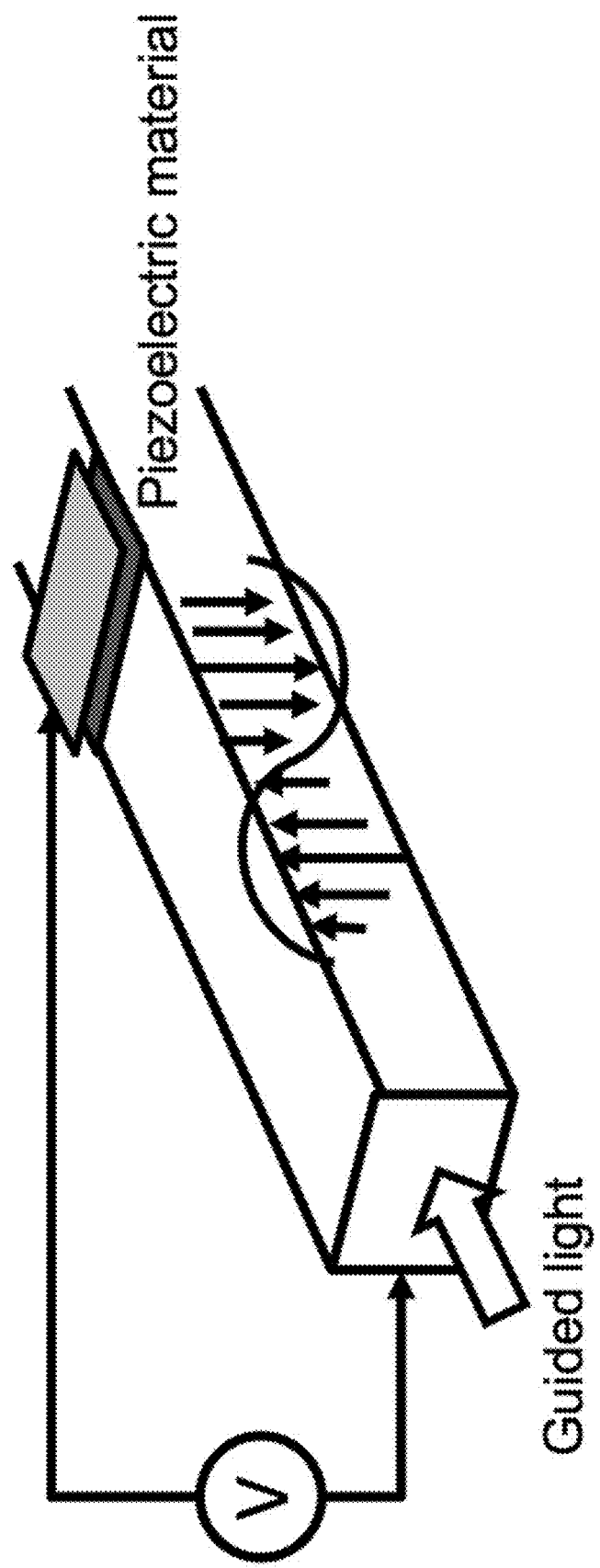
FIG. 12 is a schematic illustrating piezoelectric material deposited on a silicon waveguide and inducing a vertical sheer mode according to aspects of the present disclosure.

As previously noted, to excite acoustic modes within optical waveguides, individual actuators (transducers) positioned on optical waveguides may be constructed by placing piezoelectric materials on silicon optical waveguides. As shown illustratively in FIG. 12, if a patch of piezoelectric material is deposited on the top of a silicon waveguide and a voltage is applied between an electrical contact of the piezoelectric material and the silicon waveguide, an acoustic wave is created in the waveguide exhibiting a vertical sheer.

Figure 13:
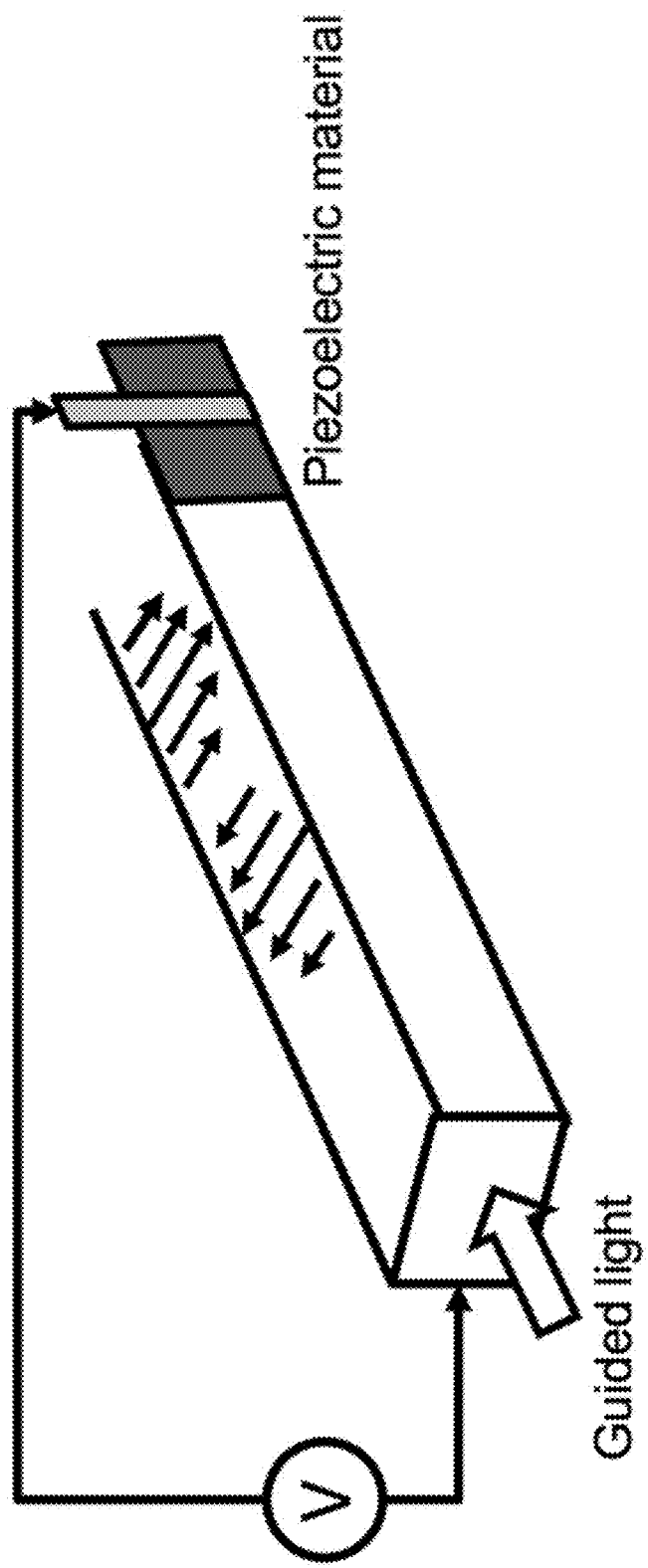
FIG. 13 is a schematic illustrating piezoelectric material positioned adjacent to a side of an optical waveguide to induce a sideways acoustic mode according to aspects of the present disclosure.

Similarly, and a shown schematically in FIG. 13, if a piezoelectric material is deposited on the side of the optical waveguide and a voltage is applied between an electrical contact of the piezoelectric material and the silicon optical waveguide the shape of the acoustic wave created will exhibit a sideways sheer.

We note at this point that in silicon, the refractive index changes obtainable from compressive waves—in which the density of the material in some areas is increased and decreased—is higher that the shear waves in which atoms move in a lateral direction in a crystal structure.

Figure 14:
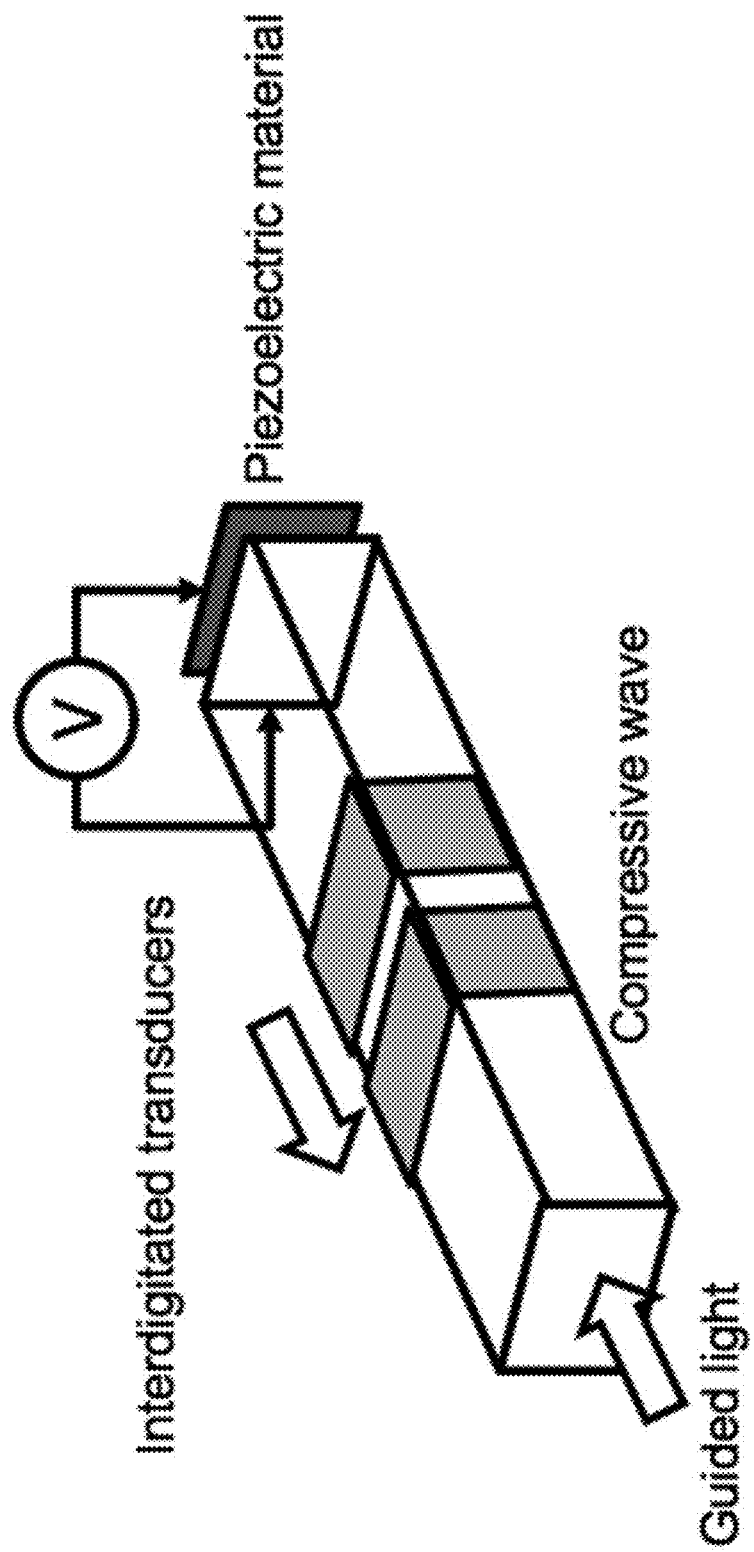
FIG. 14 is a schematic illustrating piezoelectric material positioned at an end of an optical waveguide to induce a compressive wave along a length of the waveguide according to aspects of the present disclosure.

One way of creating a compressive acoustic wave within an optical waveguide is achieved placing a piezoelectric transducer at an end of the waveguide and illustrated schematically in FIG. 14. The compressive and expansive force(s) that the piezoelectric material exerts upon activation produces an expansive and compressive wave that travels down (along) the waveguide and interacts with any guided optical wave traveling therein.

Figure 15:
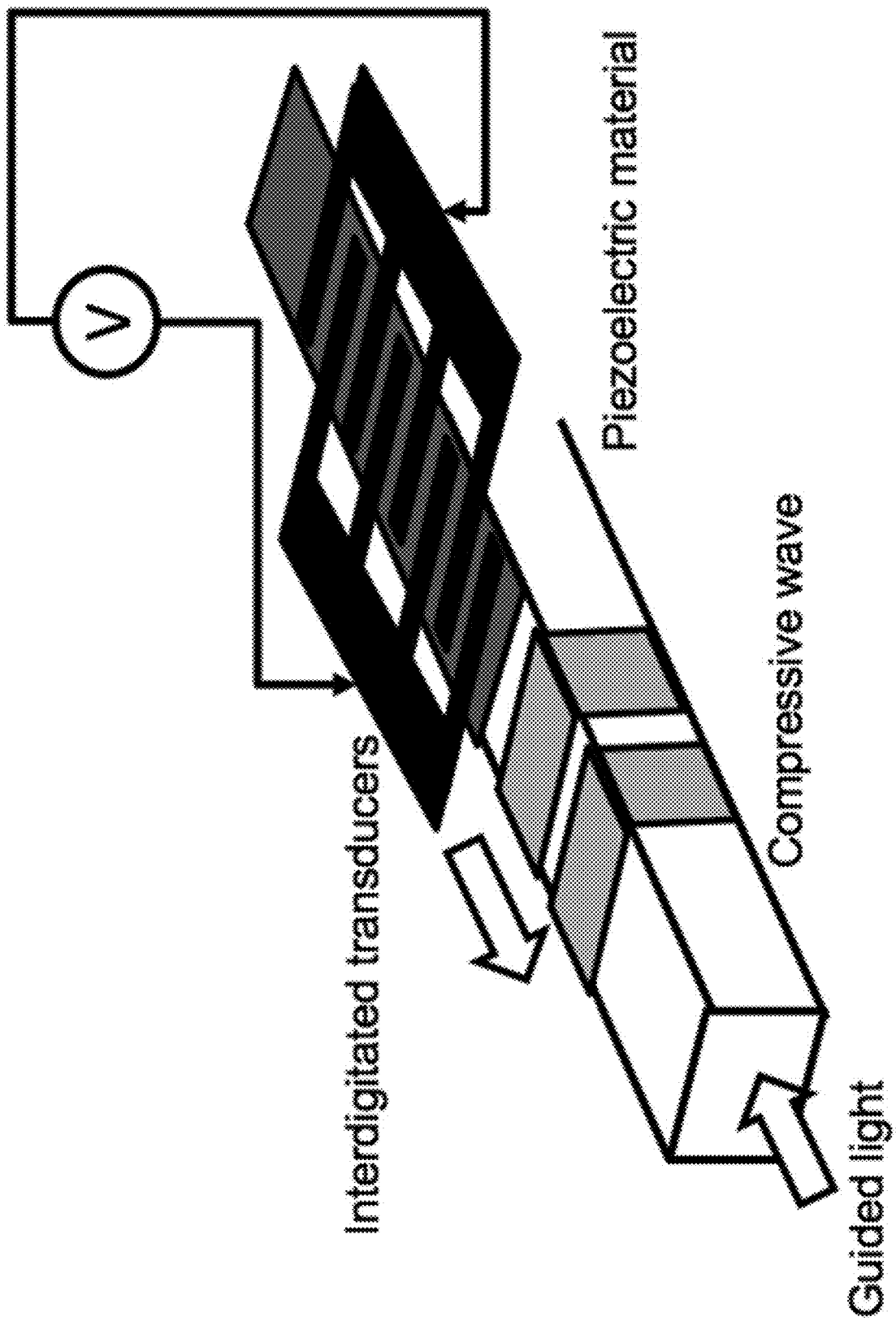
FIG. 15 is a schematic illustrating interdigitated piezoelectric material positioned adjacent to a side of an optical waveguide to induce compressive acoustic waves along a length of the waveguide according to aspects of the present disclosure.

Another way of creating a compressive wave is achieved by placing interdigitated piezoelectric materials (transducer forks) on the optical waveguide as shown illustratively in FIG. 15. The periodic structure of the interdigitated transducer imposes a particular wavelength to the period of the created acoustic wave and any perturbation grating resulting therefrom. Preferably, the length and number of periods of the interdigitated transducers should be kept relatively small to effectively excite a wide range of wavelengths.

Figure 16:
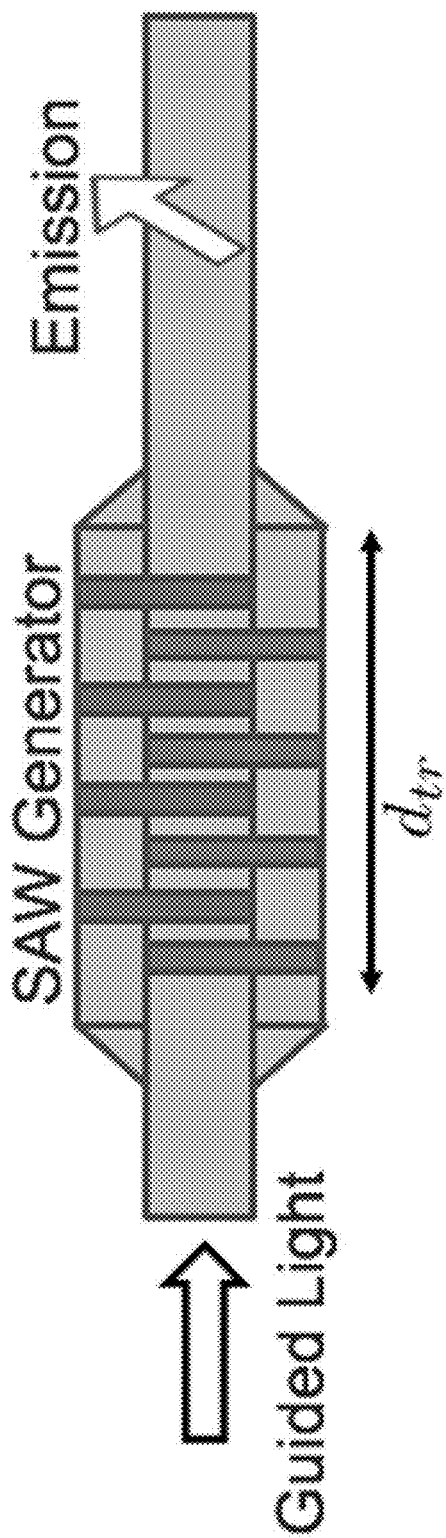
FIG. 16 is a schematic illustrating a periodic series of doped regions of an optical waveguide configured to convert RF electronic energy into an acoustic wave from internal Coulomb force(s) according to aspects of the present disclosure.

Yet another way of creating acoustic waves in an optical waveguide according to the present disclosure is by directly manipulating the optical waveguide rather than mechanical excitation via piezoelectric transducer. Such a method is illustrated schematically in FIG. 16, which illustrates a periodic series of doped regions within an optical waveguide that convert RF electronic energy into an acoustic wave from internal Coulombic force(s)—according to still another aspect of the present disclosure. As may be observed from that FIG. 16, p and n doped regions are interlaced through an excitation region—which may advantageously be undercut for increased efficiency. Of further advantage, side ridge structures may provide for electrical contacts to the doped regions while an emission portion of the waveguide does not require electrical contact(s) or ridge structure(s).

Electrooptic Tuning

Another approach for dynamically tuning emission direction(s) according to the present disclosure employs static lithographically gratings and change its effective period by modifying its effective index. As illustrated previously in FIG. 2, the direction of emission is determined by the wave vector of the grating namely, $$K = \eta_{eff} \frac{2\pi}{\Lambda}.$$

Figure 17:
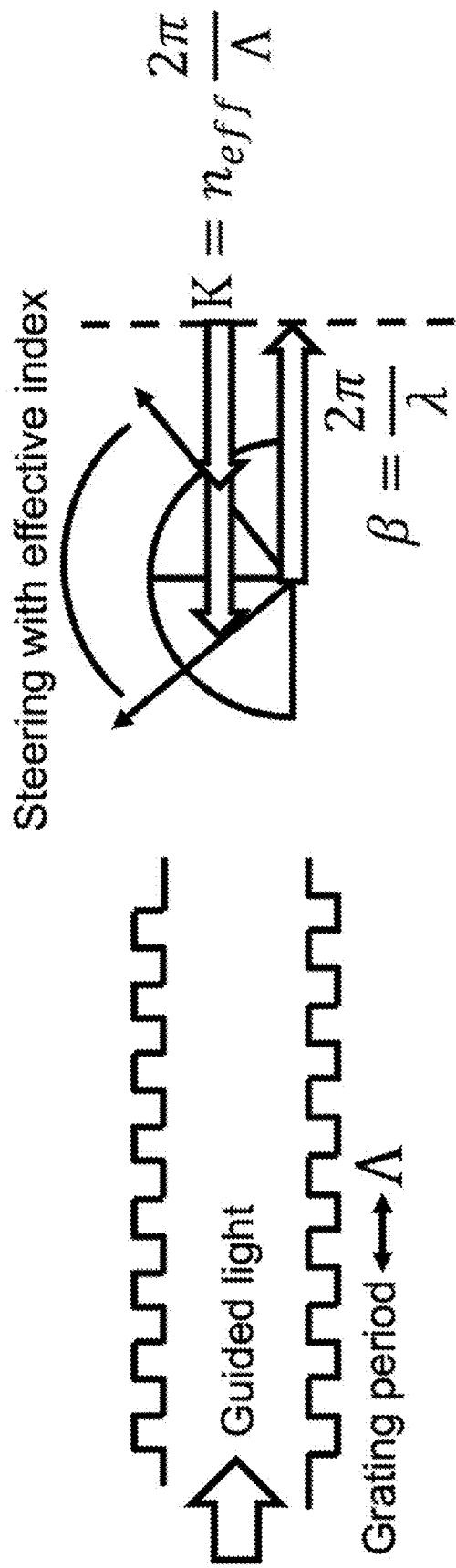
FIG. 17 is a schematic illustrating electrooptic tuning of an optical grating by changing an effective index of the grating a phase matching condition and direction of emission changes as well according to aspects of the present disclosure.

Note that if the period of the grating, $\Lambda$, is fixed, its wave vector K may be tuned by modifying the effective index $\eta_{eff}$. As shown illustratively in FIG. 17, when the effective index of a guiding structure is changed, the phase matching condition $$K_x = \frac{2\pi}{\lambda} - \eta_{eff} \frac{2\pi}{\Lambda},$$

in which $K_x$ is the horizontal component of the radiation wave vector which—when changed—changes the angle of emission. In particular the larger the effective index of the waveguide becomes, the more backward the direction of emission.

Advantageously, there are several methods according to the present disclosure for modifying the effective index of the guided mode. Local heating of the waveguide can decrease the effective index, fluidic integration can modify the index of regions surrounding the waveguide, and electrooptic effects can modulate the index of a waveguide grating directly. Note that if the number of gratings is large—as in a large phased array—the power consumed of the whole aperture becomes an important consideration and electrooptic effect mechanisms is an attractive option in such configurations. In material and structures exhibiting a second order susceptibilities, Pockels (linear electro-optic effect) in which the refractive index change is proportional to the electric field may be employed to modify the refractive index with an electric field. In silicon waveguides, either a free carrier effect or DC Kerr effect (quadratic electro-optic effect) can be advantageously employed to locally modify the refractive index. When free carriers are injected or depleted from a semiconductor light guiding material such as a silicon waveguide, a plasma dispersion effect alters the refractive index of the material.

Figure 18:
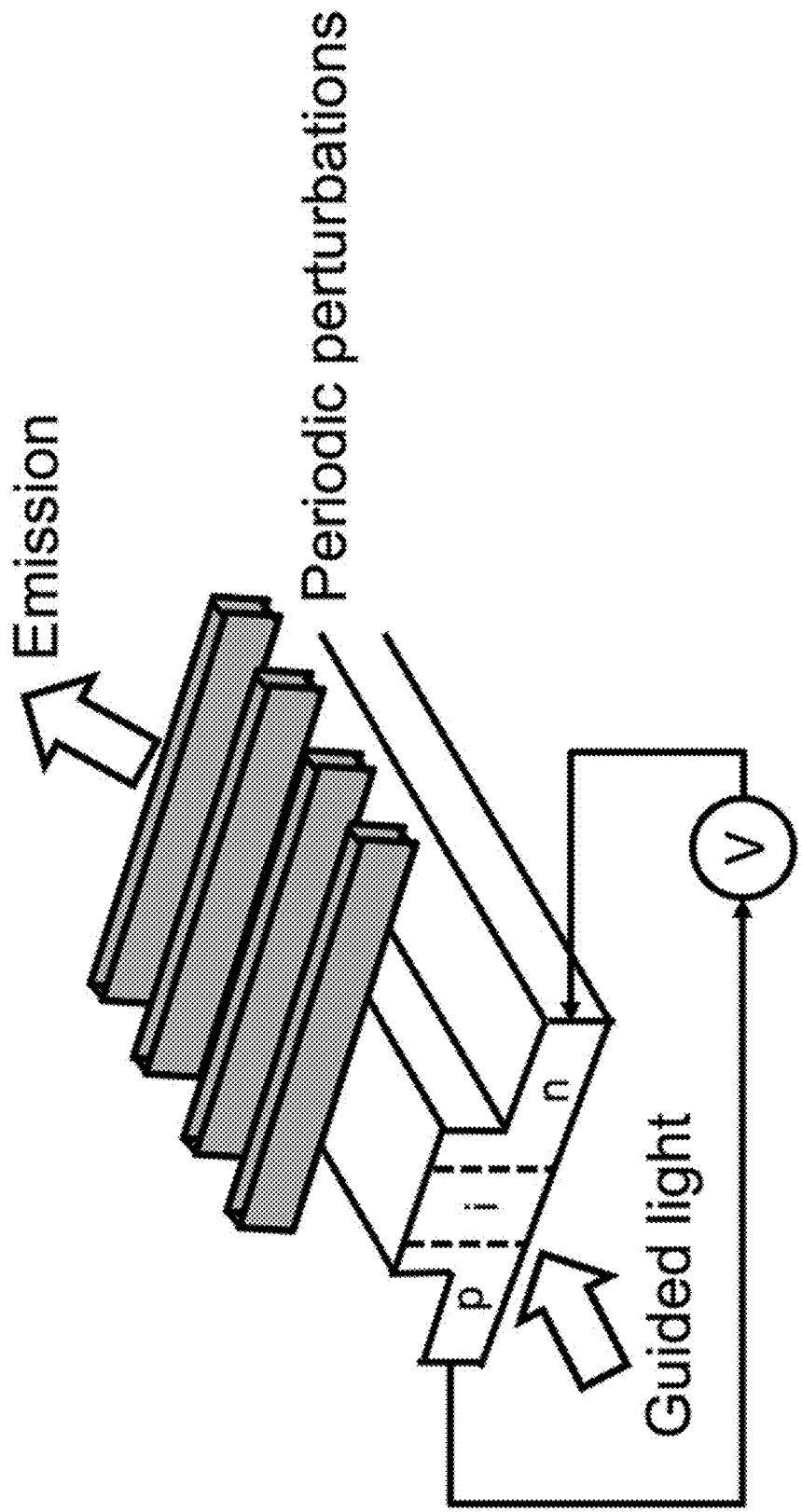
FIG. 18 is a schematic illustrating an application of a voltage across a p-n junction of an optical waveguide changes free carrier density in the waveguide such that direction of emission is changed according to aspects of the present disclosure.

For example, FIG. 18 illustratively shows in schematic form that biasing a pn junction across a silicon waveguide can change its refractive index and result in steering of a light beam due to a change in the effective period of a grating structure ($\Lambda_{eff}=\Lambda/\eta_{eff}$). More particularly, the application of a voltage across the pn junction changes the free carrier density in the waveguide and effectively tunes the direction of emission. Accordingly, the structure illustratively shown in FIG. 18 may be used to fine tune the direction of emission. However, since the electrooptic effect due to free carriers is a relatively small effect, the effective period of the grating is changed only slightly around the period set by periodic perturbation structures. As a result, structures such as that shown in FIG. 18 will not generally steer light across an entire field of view.

Figure 19:
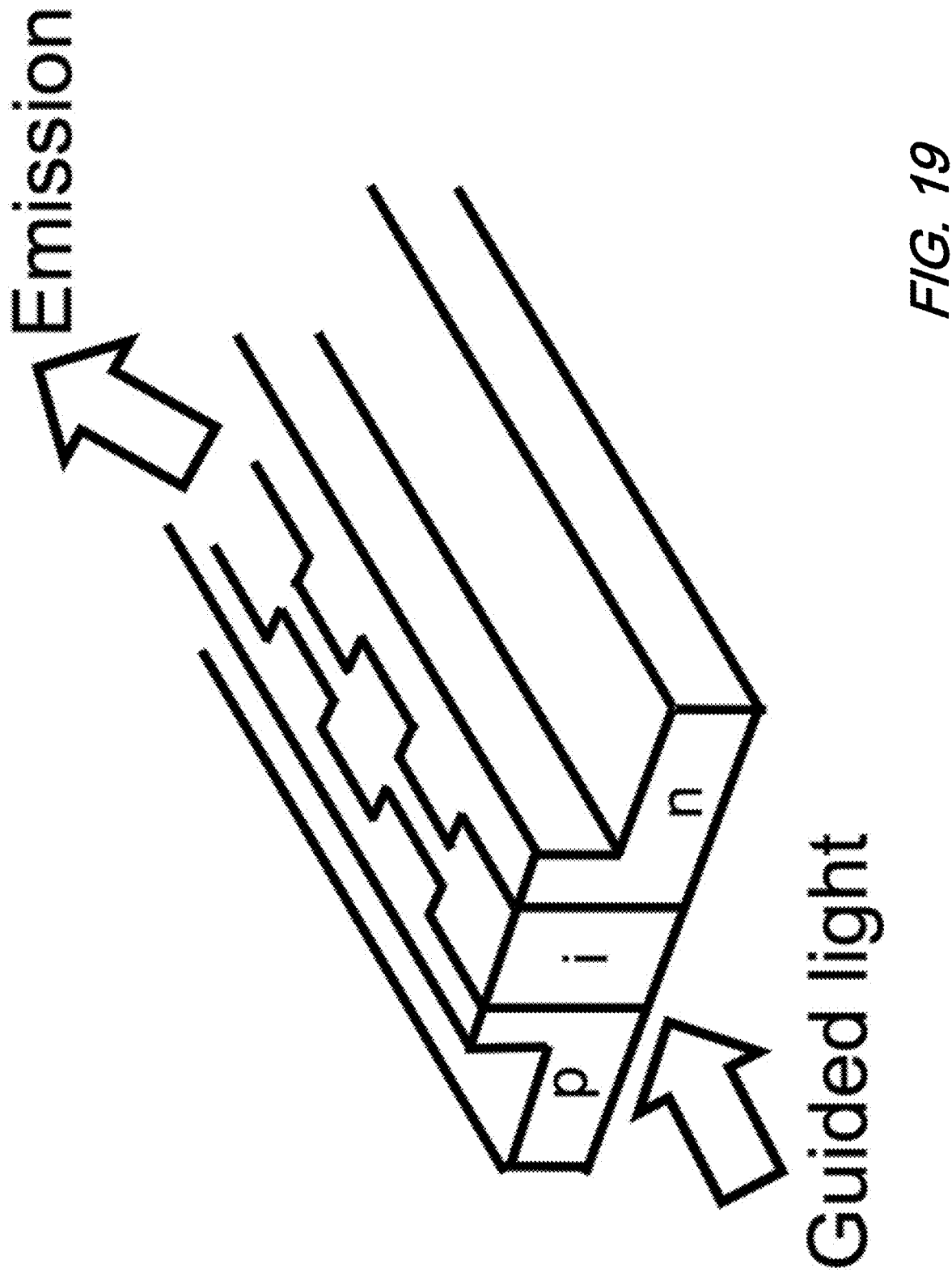
FIG. 19 is a schematic illustrating a voltage controlled p-n junction operating as a tunable grating according to aspects of the present disclosure.

Alternatively—and according to still another aspect of the present disclosure—free carriers themselves may be the perturbation mechanism and advantageously achieve full tunability of a grating structure. With reference to FIG. 19, there is shown an illustrative schematic of a voltage controlled pn junction acting as a tunable junction. Note that the width of the intrinsic region and any charge accumulation in the doped regions is a function of the local voltage. If the voltage across the pn junction is a periodic function of the position along the waveguide, the refractive index change created by the free carrier plasma effect is periodic and therefore such structures will emit light in the direction that satisfies the phase matching condition.

Figure 20:
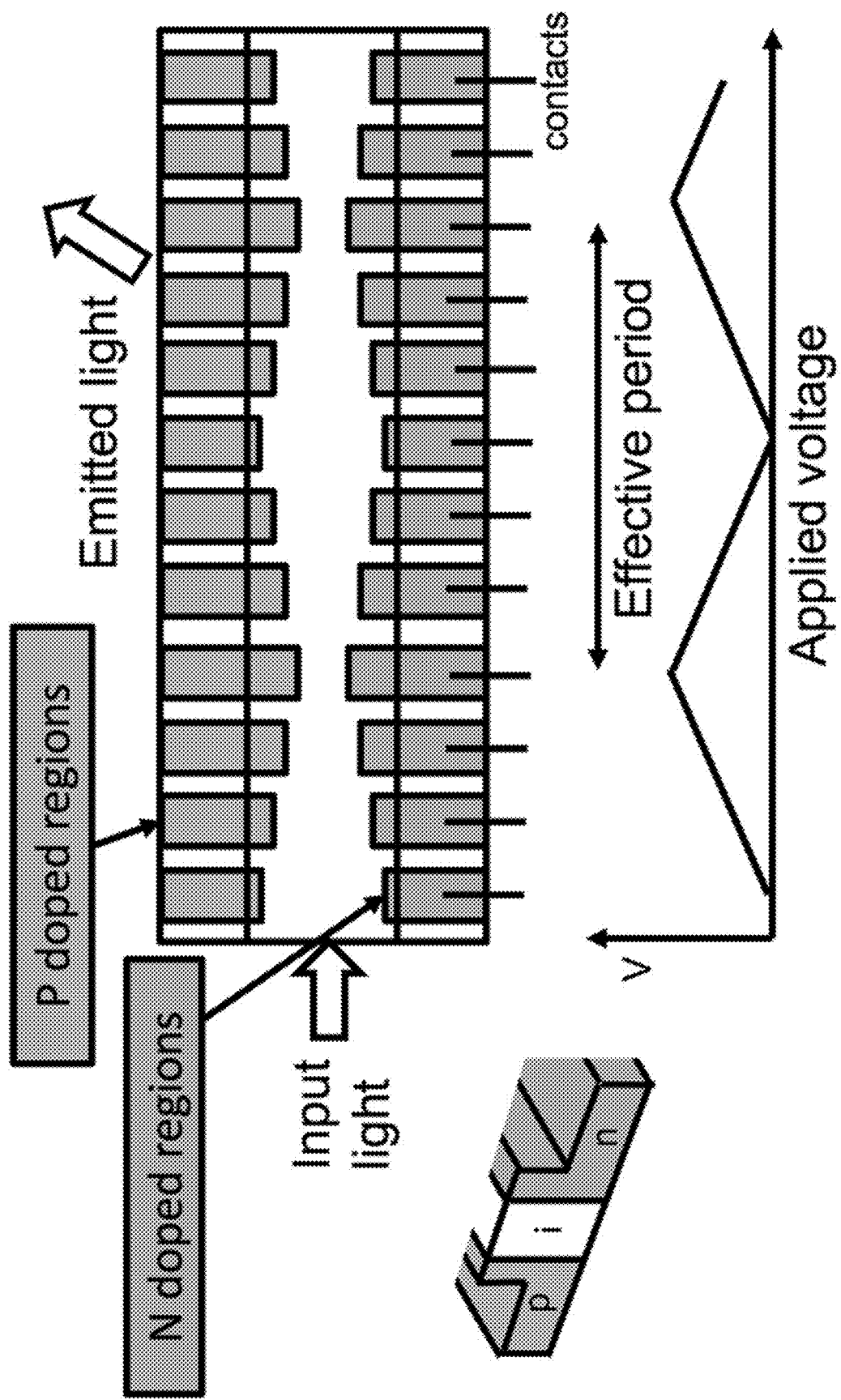
FIG. 20 is a schematic illustrating the application of a periodic voltage function to p-n junction segments of a waveguide resulting in the perturbation of a refractive index of the waveguide according to aspects of the present disclosure.

To create the above-noted periodic voltage distribution along the waveguide, doping regions may be segmented into small section each controlled by an individual voltage and separated by neighboring sections by an intrinsic region as illustrative shown schematically in FIG. 20. As illustrated in that figure, and according to yet another aspect of the present disclosure, by applying a periodic voltage to pn junction segments the refractive index of the guiding structure is perturbed.

Advantageously, each section may be individually controlled by an individual voltage and essentially any desirable perturbation may be created across the waveguides. Since gratings created in this manner are inherently weak due—in part—to the small perturbation induced by the free carrier, the length of the grating should preferably be thousands of periods long. Of course, such "long" gratings require thousands of individual voltage controls.

Advantageously, if a photonics structure such as that illustrated in the figure is directly controlled by a CMOS driving circuit, individual driving transistors may be programmed to drive the photonics grating with a desired voltage pattern. If, on the other hand, the number of required control (driving) signals/connections is not available, a standing wave RF signal may be maintained along any electrodes feeding the pn junctions. Such standing wave function, having a period with is dependent upon the frequency of an applied RF signal, may be sampled with discrete contacts along the length of a pn junction waveguide to create the desired periodic charge accumulation pattern along the waveguide.

Figure 21:
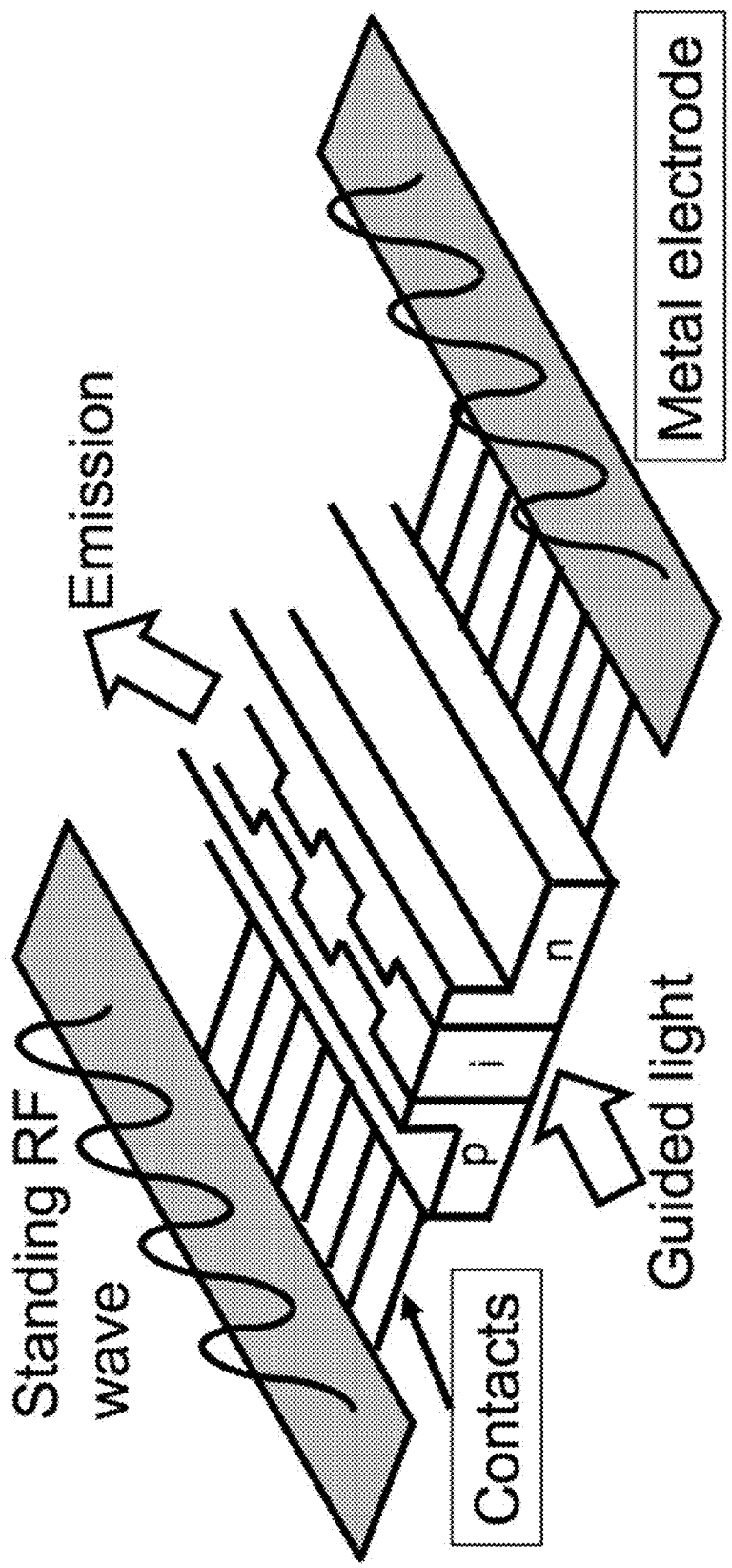
FIG. 21 is a schematic illustrating the application of a standing RF wave to p-n junction segments of a waveguide resulting in the formation of a grating having a period that is tuned according to the frequency of the RF signal according to aspects of the present disclosure.

Turning now to FIG. 21, there is shown a schematic illustrating a standing wave RF signal creating a periodic pattern required for a grating wherein the period of the grating is tuned with the frequency of the RF signal—according to aspects of the present disclosure. Note that one challenge in creating devices having a pn junction grating perturbation mechanism is that fabrication of sub-wavelength segments required can be difficult due to the straggle dopants experience while being implanted into the waveguide.

Figure 22:
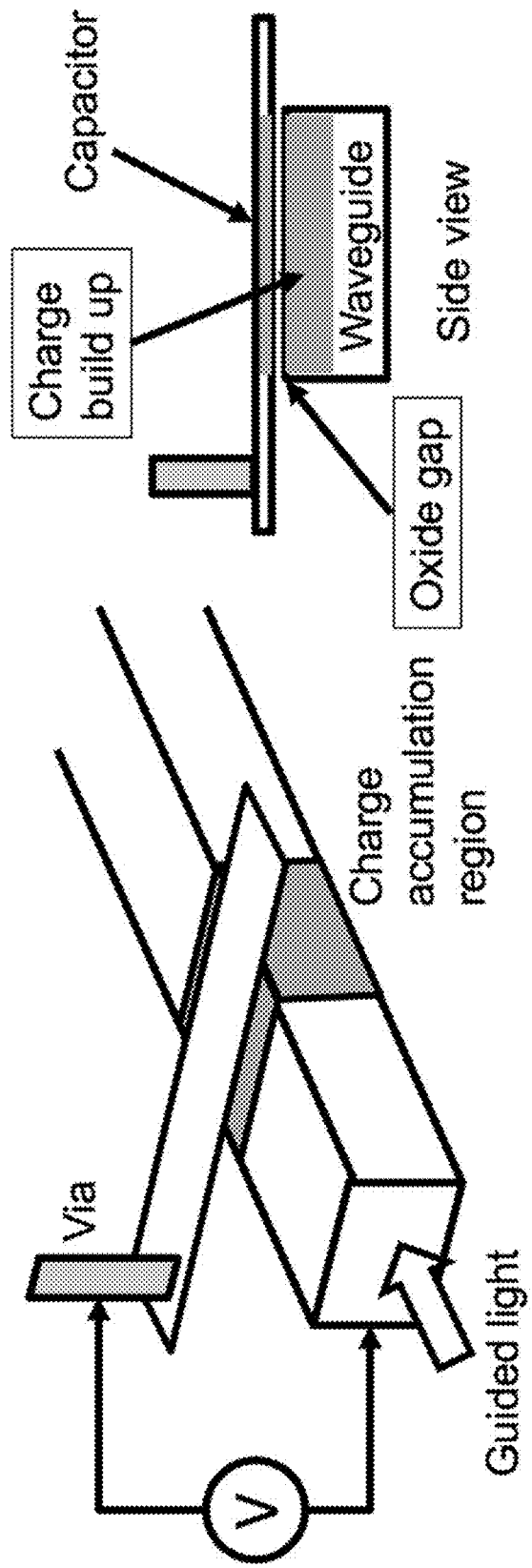
FIG. 22 is a schematic illustrating the application of a voltage to a semiconductor-on-semiconductor capacitor results in charge build-up according to aspects of the present disclosure.
Figure 23:
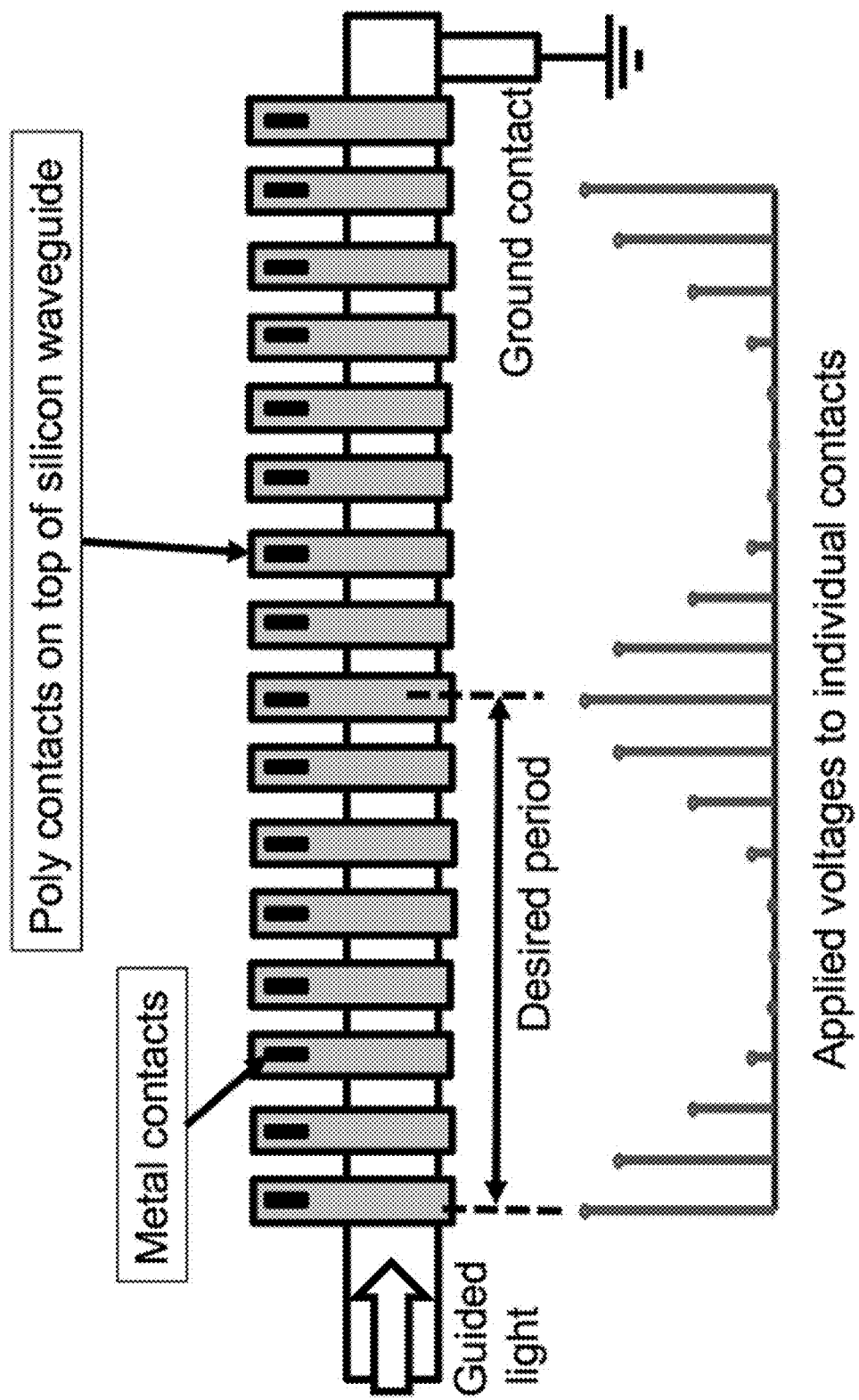
FIG. 23 is a schematic illustrating the creation of a periodic index perturbation in a silicon waveguide from the application of a periodic pattern of voltages to polysilicon segments of the waveguide according to aspects of the present disclosure.

An alternative method to these pn junction devices are devices employing capacitive induction of free carrier accumulation regions. For example, as illustratively shown in FIG. 22, a voltage applied to a semiconductor positioned on top (or other location) of a light conducting waveguide can induce accumulation of free carriers in a small portion of the waveguide and locally perturb its effective index. As illustratively shown in that figure, application of a voltage to the semiconductor-on-semiconductor capacitor leads to a charge build up in the region. Similar to that illustratively shown in FIG. 20, if the length of waveguide is divided into a large number of small segments—each individually controlled by a different voltage along the length of the waveguide—a periodic pattern of carrier induced perturbation can be created along the length of the waveguide which in turn acts as a tunable grating. FIG. 23 illustratively shows the application of a periodic pattern of voltages to polysilicon segments results in a periodic index perturbation in a silicon waveguide.

As may be observed from FIG. 23, small sections (pieces) of polysilicon semiconductor can be deposited on top of a silicon waveguide. A thin (few nanometers) layer of an insulating material such as silicon dioxide may be sandwiched between the silicon waveguide and the polysilicon segments. Both the silicon waveguide and the polysilicon segments should be slightly doped to conduct carriers sufficiently. The doping of both however should be slight enough to reduce loss the optical mode experiences as it travels along the silicon waveguide. The optical mode—in a preferred embodiment—should be tightly confined to the silicon waveguides so that it should not interact with the thin and small polysilicon segments as if they were part of a static perturbing grating.

Figure 24:
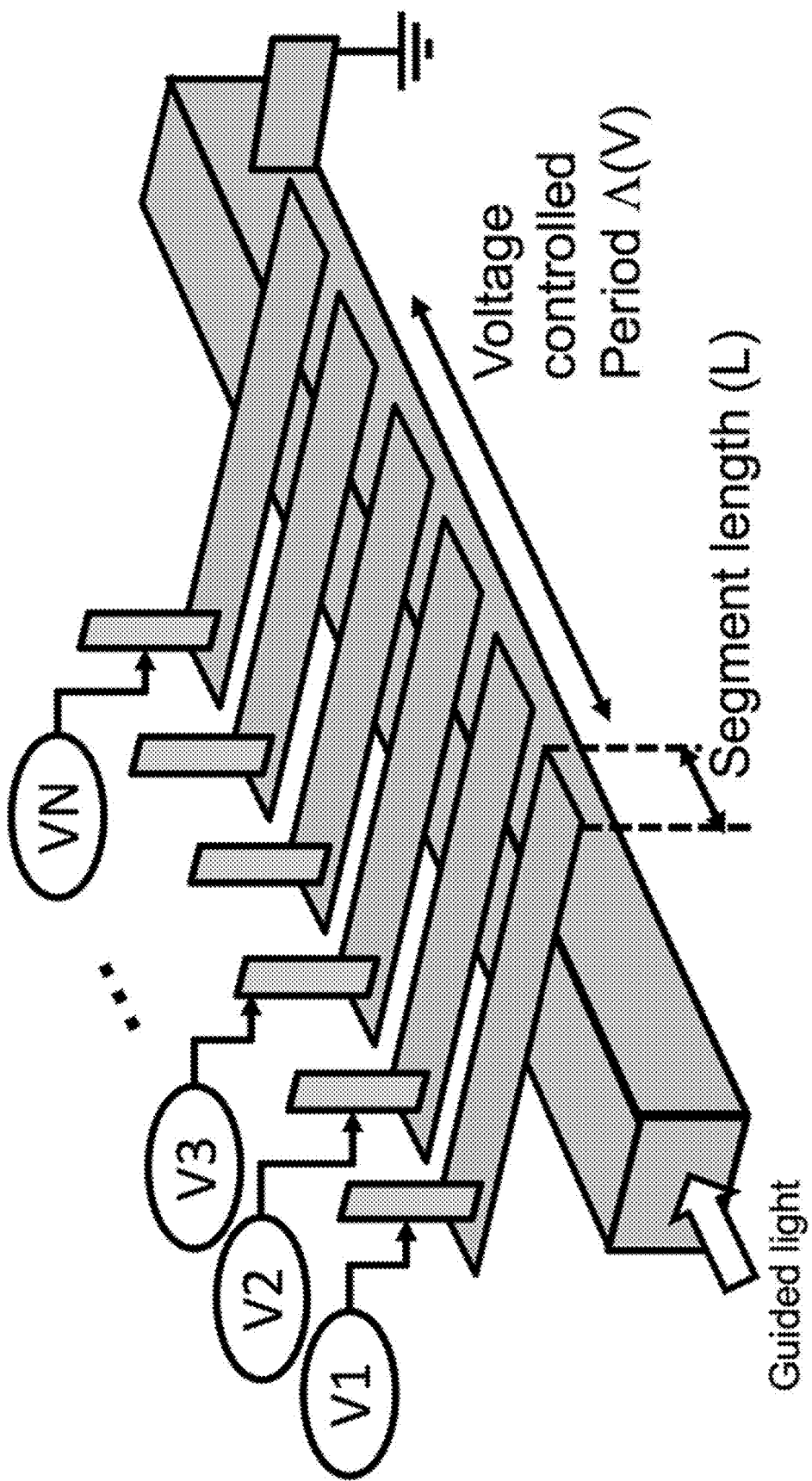
FIG. 24 is a schematic illustrating short and thin segments of polysilicon deposited above a silicon waveguide that are controlled by individual voltages according to aspects of the present disclosure.
Figure 25:
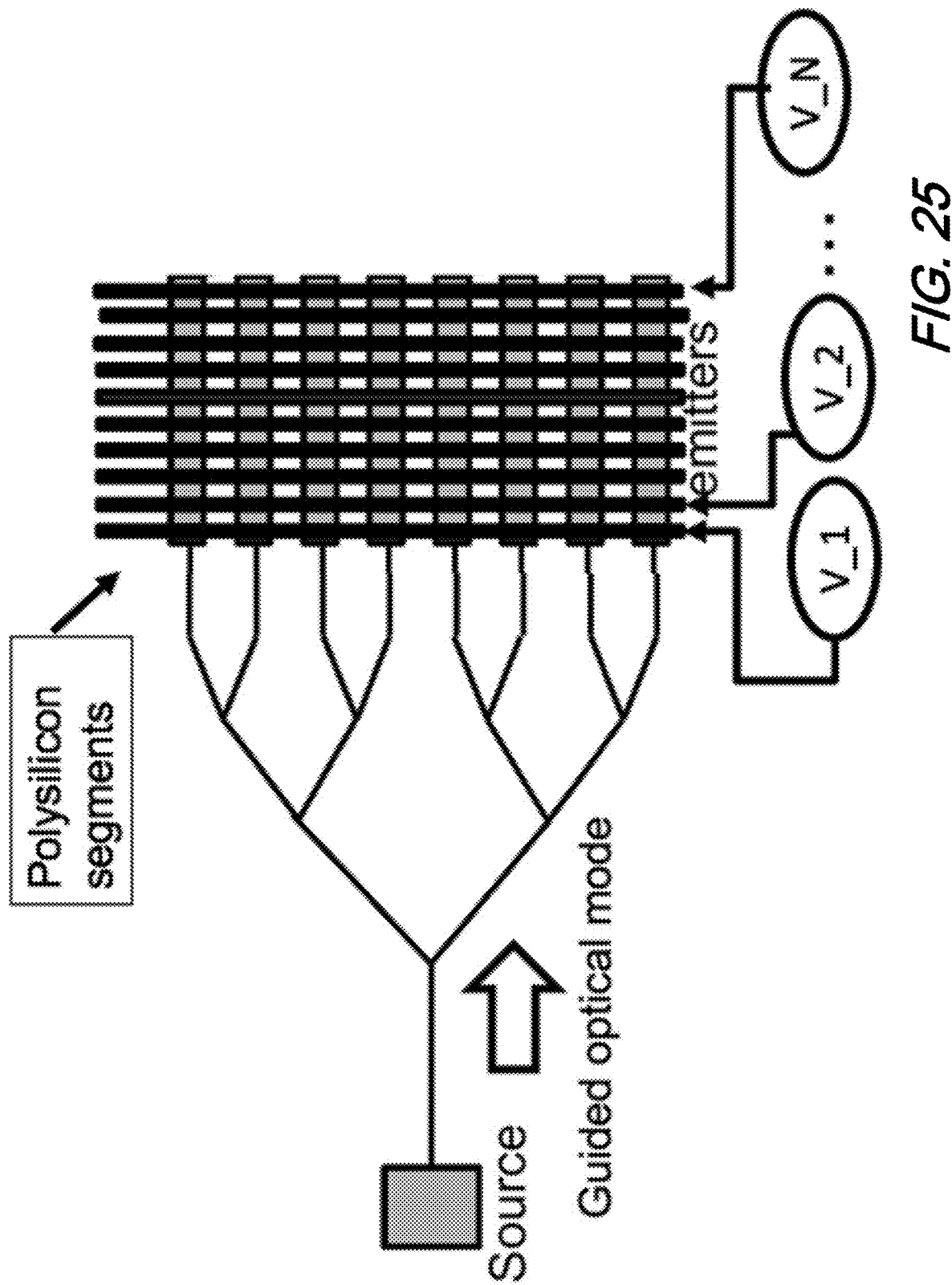
FIG. 25 is a schematic illustrating long segments of polysilicon used to excite a plurality of waveguides in parallel according to aspects of the present disclosure.

FIG. 24 is a schematic illustrating short and thin segments of polysilicon deposited above a silicon waveguide controlled by individual voltages according to aspects of the present disclosure. As may be observed from that figure, a large number of segments of polysilicon are deposited or otherwise positioned on top of the silicon optical waveguide. The segment length (L) and the gap between the segments is sufficiently small such that several of these will fit within one desired period length. If the number of segments in one period is not a large number, the periodic voltage function may be down-sampled and this will lead to loss to unwanted radiation modes. Notwithstanding, if the voltage to all electrodes is independently controlled, a wavelength sweep can be continuous without the need for the wavelength to be an integer multiple of the segments' period. Advantageously, in most circumstances, all of the waveguide members of a phased array have the same grating pattern, so the voltage used to create the grating may be applied to all waveguides simultaneously. In fact, the same polysilicon segment may be extended over the entire array to charge up and perturb all waveguides at the same time. FIG. 25 is a schematic illustrating long segments of polysilicon used to excite all waveguides in parallel as part of a phased array according to aspects of the present disclosure.

Figure 26:
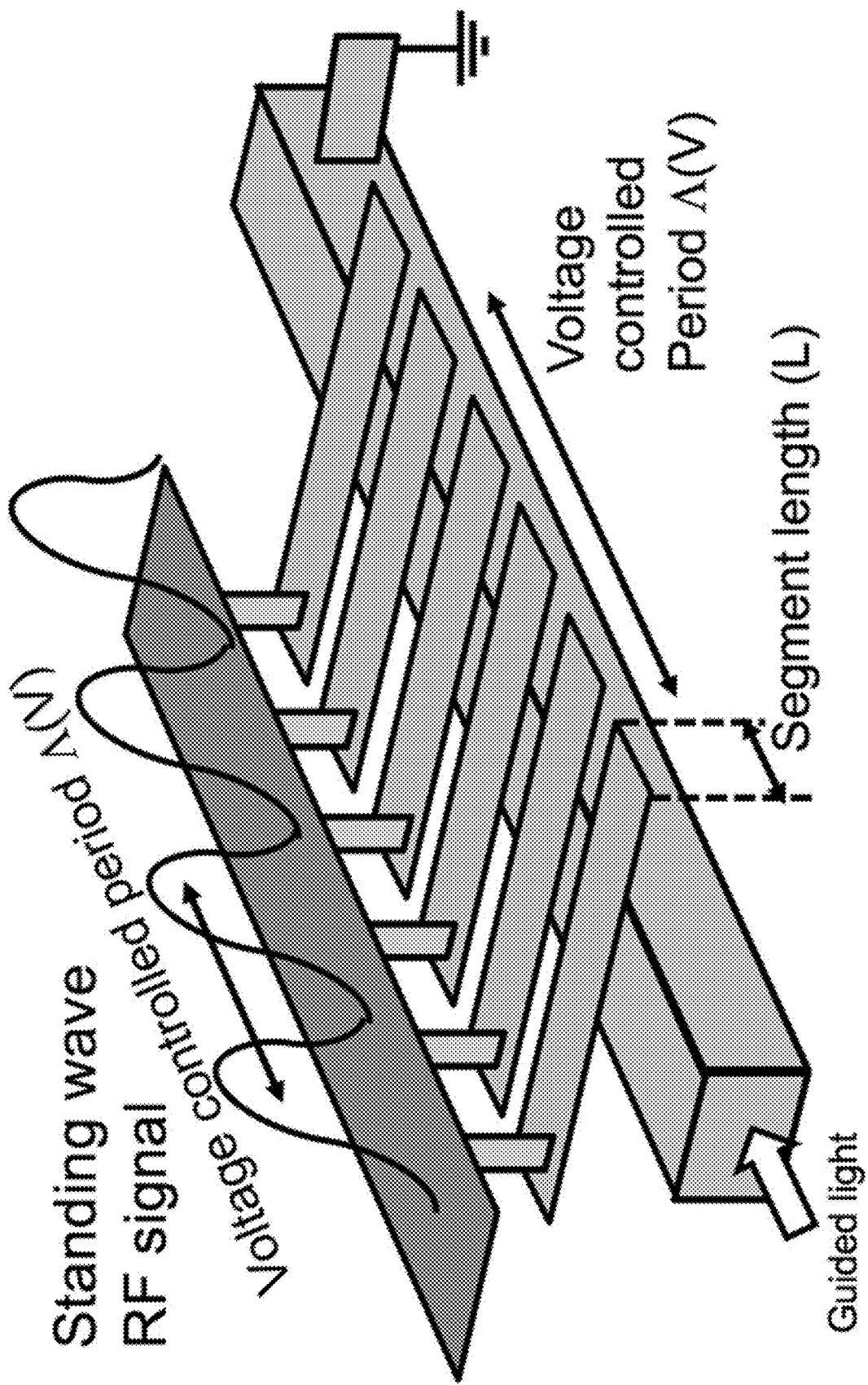
FIG. 26 is a schematic illustrating generation of a periodic voltage pattern in an optical waveguide from a standing RF according to aspects of the present disclosure.

Note that as discussed previously with respect to the pn junction-based structures, the thousands of individual voltages required to create a tunable periodic voltage pattern might not be available if direct CMOS control of a grating is not implemented. Similar to the pn junction-based structures, an RF standing wave may be imposed on a metallic wire running parallel to the waveguide such that a desired periodic voltage pattern is induced onto the waveguide. As may be observed in illustrative FIG. 26 there is shown a standing RF signal inducing periodic voltage patterns in an optical waveguide according to aspects of the present disclosure. The segments shown therein—which are illustratively formed from polysilicon—"sample" the periodic voltage function at regular intervals and induce a periodic charge accumulation pattern along the length of the waveguide. Advantageously, by changing the frequency of the RF standing wave the period of the induced grating and the direction of emission may be tuned as desired. The high frequency of the RF wave to achieve this required period for emission out of a silicon waveguide might be undesirable.

At this point, while we have presented this disclosure using some specific examples, those skilled in the art will recognize that our teachings are not so limited. Accordingly, this disclosure should be only limited by the scope of the claims attached hereto.

The invention claimed is:

1. A method of forming an optical structure comprising:
   providing an optical waveguide having a light guiding core;
   inducing dynamic index perturbations in the light guiding core through an electro-optic effect, said dynamic index perturbations sufficient to affect the emission of light traversing the optical waveguide, said emission in a direction out-of-plane relative to the waveguide, where said direction is based at least in part on a spatial period of the dynamic index perturbations along the light guiding core;
   wherein a plurality of contacts apply a voltage distribution along the waveguide, and the waveguide includes regions segmented into sections that are each controlled by an individual voltage applied by a respective one of the contacts.

2. The method of claim 1, further comprising varying the induced dynamic index perturbations over time such that said direction changes over time in response to a change in the spatial period over time.

3. The method of claim 1, wherein the core of the optical waveguide exhibits a thickness of less than 1λ, where λ is the wavelength of the light traversing the optical waveguide.

4. The method of claim 1, wherein at least a portion of the out-of-plane emission of the light is in a perpendicular direction relative to a direction of travel of the traversing light.

5. The method of claim 1, wherein said dynamic index perturbations are varied such that an emission angle associated with the out-of-plane emission varies with the varying dynamic index perturbations.

6. The method of claim 1, wherein the optical structure is part of a phased array.

7. The method of claim 6, wherein the phased array includes a plurality of emitters, each individual one of the emitters including an individual one of the optical structure.

8. The method of claim 7, wherein each individual one of the optical structures includes an electro-optic transducer that upon activation induces the dynamic index perturbations into the waveguide, the electro-optic transducers operationally driven by an RF signal originating from a common source.

9. The method of claim 7, wherein each individual one of the optical structures includes an electro-optic transducer that upon activation induces the dynamic index perturbations into the waveguide, the electro-optic transducers operationally driven by an individual RF signal originating from a respective individual source, each individual RF signal exhibiting a different frequency or phase offset from the other individual RF signals.

10. The method of claim 1, wherein the spatial period corresponds to a period of a wave of an electrical signal along an electrode that applies an electric field across the light guiding core to induce the dynamic index perturbations.

11. The method of claim 10, wherein the wave of the electrical signal comprises a standing wave.

12. The method of claim 10, wherein the electrical signal comprises a radio frequency (RF) signal.

13. The method of claim 1, wherein each section of a plurality of the sections includes a p-type doping region and an n-type doping region separated by an intrinsic region.

14. An optical device comprising:
   an optical waveguide including a light guiding section;
   a dynamic index perturbation generator configured to dynamically generate index perturbations in the light guiding section through an electro-optic effect;
   such that upon activation of the dynamic index perturbation generator and the generation of index perturbations in the light guiding section, light traversing the light guiding section is emitted in a direction out-of-plane relative to the light guiding section, where said direction is based at least in part on a spatial period of the index perturbations along the light guiding section;
   wherein the dynamic index perturbation generator includes a plurality of contacts configured to apply a voltage distribution along the waveguide, and the waveguide includes regions segmented into sections that are each controlled by an individual voltage applied by a respective one of the contacts.

15. The optical device of claim 14, wherein the dynamic index perturbation generator is configured to vary the induced dynamic index perturbations over time such that said direction changes over time in response to a change in the spatial period over time.

16. The optical device of claim 14, wherein the light guiding section exhibits a thickness of less than 1λ, where λ is the wavelength of the light traversing the optical waveguide.

17. The optical device of claim 14, configured such that at least a portion of the out-of-plane emission of the light is in a perpendicular direction relative to a direction of travel of the traversing light.

18. The optical device of claim 14, wherein the dynamic index perturbation generator is configured such that the dynamic index perturbations are varied and an emission angle associated with the out-of-plane emission varies with the varying dynamic index perturbations.

19. The optical device of claim 14, wherein the optical device is part of a phased array that includes a plurality of emitters, each individual one of the emitters including an individual one of the optical device.

20. The optical device of claim 19, wherein each individual one of the optical devices includes an electro-optic transducer that upon activation induces the dynamic index perturbations into the waveguide, the electro-optic transducers operationally driven by an RF signal originating from a common source.

21. The optical device of claim 19, wherein each individual one of the optical devices includes an electro-optic transducer that upon activation induces the dynamic index perturbations into the waveguide, the electro-optic transducers operationally driven by an individual RF signal originating from a respective individual source, each individual RF signal exhibiting a different frequency or phase offset from the other individual RF signals.

22. The optical device of claim 14, wherein the spatial period corresponds to a period of a wave of an electrical signal along an electrode of the dynamic index perturbation generator that applies an electric field across the light guiding section to generate the index perturbations.

23. The optical device of claim 22, wherein wave of the electrical signal comprises a standing wave.

24. The optical device of claim 22, wherein the electrical signal comprises a radio frequency (RF) signal.

25. The optical device of claim 14, wherein each section of a plurality of the sections includes a p-type doping region and an n-type doping region separated by an intrinsic region.

\* \* \* \* \*